United States Patent
Gulwani et al.

(10) Patent No.: US 9,542,622 B2
(45) Date of Patent: Jan. 10, 2017

(54) FRAMEWORK FOR DATA EXTRACTION BY EXAMPLES

(71) Applicant: Microsoft Technology Licensing, LLC, Redmond, WA (US)

(72) Inventors: Sumit Gulwani, Bellevue, WA (US); Vu Minh Le, Davis, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/636,664

(22) Filed: Mar. 3, 2015

(65) Prior Publication Data
US 2015/0254530 A1   Sep. 10, 2015

Related U.S. Application Data

(60) Provisional application No. 61/950,062, filed on Mar. 8, 2014.

(51) Int. Cl.
| G06K 9/00 | (2006.01) |
| G06K 9/62 | (2006.01) |
| G06F 17/30 | (2006.01) |
| G06F 17/24 | (2006.01) |

(52) U.S. Cl.
CPC .......... *G06K 9/6261* (2013.01); *G06F 17/246* (2013.01); *G06F 17/30914* (2013.01); *G06K 9/00456* (2013.01)

(58) Field of Classification Search
CPC .............. G06K 9/6261; G06K 9/00456; G06F 17/30914
USPC ........................................................ 382/187
See application file for complete search history.

(56) References Cited

U.S. PATENT DOCUMENTS

| 7,890,533 B2 | 2/2011 | Pollara |
| 8,180,753 B1 | 5/2012 | Wang |
| 8,589,366 B1 | 11/2013 | Younes et al. |
| 8,650,207 B2 | 2/2014 | Gulwani et al. |
| 2003/0055849 A1 | 3/2003 | Thure et al. |
| 2005/0055365 A1 | 3/2005 | Ramakrishnan et al. |

(Continued)

OTHER PUBLICATIONS

"International Search Report and Written Opinion Issued for PCT Patent Application No. PCT/US2015/019131", Mailed Date: Jul. 2, 2015, 13 Pages.

(Continued)

*Primary Examiner* — Ruiping Li
(74) *Attorney, Agent, or Firm* — Alin Corie; Sandy Swain; Micky Minhas

(57) ABSTRACT

Various technologies described herein pertain to controlling automated programming for extracting data from an input document. Examples indicative of the data to extract from the input document can be received. The examples can include highlighted regions on the input document. Moreover, the input document can be a semi-structured document (e.g. a text file, a log file, a word processor document, a semi-structured spreadsheet, a webpage, a fixed-layout document, an image file, etc.). Further, an extraction program for extracting the data from the input document can be synthesized based on the examples. The extraction program can be synthesized in a domain specific language (DSL) for a type of the input document. Moreover, the extraction program can be executed on the input document to extract an instance of an output data schema.

20 Claims, 11 Drawing Sheets

(56) References Cited

U.S. PATENT DOCUMENTS

| | | |
|---|---|---|
| 2006/0242180 A1 | 10/2006 | Graf et al. |
| 2011/0302553 A1 | 12/2011 | Gulwani |
| 2012/0089620 A1 | 4/2012 | Castellanos et al. |
| 2012/0317472 A1 | 12/2012 | Chernysh |
| 2013/0232157 A1 | 9/2013 | Kamel |
| 2014/0201126 A1* | 7/2014 | Zadeh .................... G06K 9/627 706/52 |

OTHER PUBLICATIONS

Le, et al., "FlashExtract: A Framework for Data Extraction by Examples", In ACM Principles of Programming Languages, vol. 49, Issue 6, Jun. 9, 2014, pp. 542-553.

"OpenRefine", Retrieved on: Feb. 26, 2014, Available at: <<http://openrefine.org/>>, 5 pages.

Abraham, et al., "Header and Unit Inference for Spreadsheets Through Spatial Analyses", In Proceedings of IEEE Symposium on Visual Languages and Human Centric Computing, Sep. 30, 2004, pp. 1-8.

Anton, Tobias, "Xpath-Wrapper Induction by Generalizing Tree Traversal Patterns", In Proceedings of Lernen, Wissensentdeckung und Adaptivitat, Oct. 10, 2005, 8 pages.

Chang, et al., "IEPAD: Information Extraction Based on Pattern Discovery", In Proceedings of the 10th International Conference on World Wide Web, May 1, 2001, pp. 681-688.

Crescenzi, et al., "RoadRunner: Towards Automatic Data Extraction from Large Web Sites", In Proceedings of the 27th International Conference on Very Large Data Bases, Sep. 11, 2001, 10 pages.

Cunha, et al., "From Spreadsheets to Relational Databases and Back", In Proceedings of the ACM SIGPLAN Workshop on Partial Evaluation and Program Manipulation, Jan. 19, 2009, 21 pages.

Fisher, et al., "The Next 700 Data Description Languages", In Proceedings of Conference Record of the 33rd ACM SIGPLAN-SIGACT Symposium on Principles of Programming Languages, Jan. 11, 2006, 14 pages.

Fisher, et al., "The PADS Project: An Overview", In Proceedings of the 14th International Conference on Database Theory, Mar. 21, 2011, 7 pages.

Fisher, et al., "From Dirt to Shovels: Fully Automatic Tool Generation from Ad Hoc Data", In Proceedings of the 35th Annual ACM SIGPLAN-SIGACT Symposium on Principles of Programming Languages, Jan. 7, 2008, 14 pages.

Frenz, Christopher M., "Pro Perl Parsing", In Proceedings of Apress, Aug. 22, 2005, 273 pages.

Gulwani, Sumit, "Automating String Processing in Spreadsheets using Input output Examples", In Proceedings of the 38th Annual ACM SIGPLAN-SIGACT Symposium on Principles of Programming Languages, Jan. 26, 2011, 13 pages.

Gulwani, Sumit, "Synthesis from Examples: Interaction Models and Algorithms", In Proceedings of the 14th International Symposium on Symbolic and Numeric Algorithms for Scientific Computing, Sep. 26, 2012, 7 pages.

Gulwani, et al., "Spreadsheet Data Manipulation using Examples", In Communications of the ACM, vol. 55, Issue 8, Aug. 2012, pp. 97-105.

Harris, et al., "Spreadsheet Table Transformations from Examples", In Proceedings of the 32nd ACM SIGPLAN Conference on Programming Language Design and Implementation, Jun. 4, 2011, 17 pages.

Hsu, et al., "Generating Finite-State Transducers for Semi-Structured Data Extraction from the Web", In Journal of Information Systems—Special Issue on Semistructured Data, vol. 23, Issue 8, Dec. 1998, pp. 521-538.

Fisher, et al., "The EUSES Spreadsheet Corpus: A Shared Resource for Supporting Experimentation with Spreadsheet Dependability Mechanisms", In Proceedings of the First Workshop on End-User Software Engineering, May 21, 2005, pp. 1-5.

Kandel, et al., "Wrangler: Interactive Visual Specification of Data Transformation Scripts", In Proceedings of the SIGCHI Conference on Human Factors in Computing Systems, May 7, 2011, pp. 3363-3372.

Muslea, et al., "A Hierarchical Approach to Wrapper Induction", In Proceedings of the Third Annual Conference on Autonomous Agents, Apr. 1, 1999, pp. 190-197.

Oro, et al., "Sxpath: Extending Xpath Towards", In Journal of the VLDB Endowment, vol. 4, Issue 2, Sep. 13, 2010, pp. 1-12.

"Data Wrangler", Retrieved on: Feb. 26, 2014, Available at: <<http://vis.stanford.edu/wrangler/>>, 1 page.

"Google Refine", Retrieved on: Feb. 26, 2014, Available at: <<http://code.google.com/p/google-refine/>>, 2 pages.

"Splunk", Retrieved on: Feb. 26, 2014, Available at: <<http://www.splunk.com/>>, 2 pages.

Alves, et al., "LattesMiner: a Multilingual DSL for Information Extraction from Lattes Platform", In Proceedings of the compilation of the co-located workshops, Oct. 23, 2011, 7 pages.

Arasu, et al., "Extracting Structured Data from Web Pages", In Proceedings of the ACM SIGMOD international conference on Management of data, Jun. 9, 2003, 12 pages.

Yessenov, et al., "A Colorful Approach to Text Processing by Example", In Proceedings of the 26th Annual ACM Symposium on User Interface Software and Technology, Oct. 8, 2013, pp. 495-504.

Adelberg, Brad, "NoDoSE—A tool for Semi-Automatically Extracting Structured and Semistructured Data from Text Documents", In Proceedings of the ACM SIGMOD international conference on Management of data, Jun. 2, 1998, 25 pages.

Bonnet, et al., "Extraction and Integration of Data from Semistructured Documents into Business Applications", In International Conference on Industrial Applications of Prolog (INAP), Sep. 1997, 9 pages.

Kushmerick, Nicholas, "Wrapper Induction for Information Extraction", In Proceedings of the Fifteenth International Joint Conference on Artificial Intelligence, Aug. 23, 1997, 264 pages.

Miller, Robert C., "Lightweight Structure in Text", Carnegie Mellon University PhD Dissertation, May 2002, 341 pages.

Singh, et al., "Learning Semantic String Transformations from Examples", In Proceedings of the VLDB Endowment, vol. 5, No. 8, 2012, pp. 740-751.

Singh, et al., "Synthesizing No. Transformations from Input-Output Examples", In Computer Aided Verification, 2012, 72 pages.

Xi, et al., "A Context-free Markup Language for Semi-structured Text", In Programming Language Design Implementation, Jun. 5, 2010, 12 pages.

* cited by examiner

| | Amount | Investigator |
|---|---|---|
| Advanced Materials Processing / Analysis Center (AMPAC) | | Coffey, Kevin R. |
| | $24,500.00 | |
| Subtotal | $24,500.00 | |
| Biomolecular Science Center | | Khaled, Annette R. |
| | $155,458.00 | |
| | $71,777.00 | Zervos, Antonis S. |
| Subtotal | $227,235.00 | |
| Education (ED) | | Daire, Andrew |
| | $272,349.00 | |
| | $57,500.00 | Little, Mary E. |
| | $272,349.00 | Young, Mark E. |
| Subtotal | $602,198.00 | |

400 ⟶
302 ⟶

▨ FIRST COLOR
▧ SECOND COLOR
▦ THIRD COLOR
▪ FOURTH COLOR

FIG. 4

FRAMEWORK FOR DATA EXTRACTION BY EXAMPLES

CROSS-REFERENCE TO RELATED APPLICATION

This application claims priority to U.S. Provisional Patent Application No. 61/950,062, filed on Mar. 8, 2014, and entitled "FRAMEWORK FOR DATA EXTRACTION BY EXAMPLES", the entirety of which is incorporated herein by reference.

BACKGROUND

The information technology revolution over the past few decades has resulted in various advances. Examples of such advances include digitization of massive amounts of data and widespread access to computational devices. However, while rich digital information may be accessible, it is oftentimes difficult to manipulate and analyze such data.

Information is available in various document types such as text files, log files, spreadsheets, and webpages. These documents allow their creators flexibility in storing and organizing hierarchical data by combining presentation and formatting with the underlying data model. However, such flexibility can cause difficulty when attempting to extract the underlying data for tasks such as data processing, querying, altering a presentation view, or transforming data to another storage format. The foregoing has led to development of various domain-specific technologies for data extraction. For instance, scripting languages have been designed to support string processing in text files. Moreover, spreadsheet systems allow users to write macros using an inbuilt library of string and numerical functions, or to write arbitrary scripts in various programming languages. Further, some web technologies can be used to extract data from webpages; however, such technologies rely on knowing the underlying schema of the webpages.

Conventional programmatic solutions to data extraction can be problematic for various reasons. For instance, conventional solutions are commonly domain-specific and rely upon knowledge/expertise in different technologies for different document types. Further, conventional solutions typically rely on understanding the underlying data schema including data fields that the end user is not interested in extracting and their organization (some of which may not be visible in the presentation layer as in case of webpages). Moreover, conventional solutions oftentimes require knowledge of programming. The reliance upon knowledge/expertise in different technologies for different data types and the understanding of the underlying data schema can create challenges for programmers. Moreover, the need for knowledge of programming can result in end users who lack programming skills being unable to use these conventional solutions. As a result, users oftentimes are traditionally either unable to leverage access to rich data or have to resort to manual copy-paste, which is both time consuming and error prone.

SUMMARY

Described herein are various technologies that pertain to controlling automated programming for extracting data from an input document. Examples indicative of the data to extract from the input document can be received. The examples can include highlighted regions on the input document. Moreover, the input document can be a semi-structured document (e.g. a text file, a log file, a word processor document, a semi-structured spreadsheet, a webpage, a fixed-layout document, an image file, etc.). Further, an extraction program for extracting the data from the input document can be synthesized based on the examples. The extraction program can be synthesized in a domain specific language (DSL) that provides appropriate abstractions for the type of the input document. Moreover, the extraction program can be executed on the input document to extract an instance of an output data schema (e.g., provided by an end user).

A data extraction system can include a synthesis component configured to synthesize the extraction program for extracting the data from the input document based on the examples. The synthesis component can further be configured to execute inductive synthesis algorithms for core operators in a predefined library. The synthesis component can synthesize the extraction program by executing the inductive synthesis algorithms for the core operators, where the extraction program is synthesized in the DSL for the type of the input document. Further, the DSL can be constructed from the predefined library of the core operators.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 4 illustrates an exemplary semi-structured spreadsheet from which data can be extracted based on example(s).

DETAILED DESCRIPTION

Figure 1:
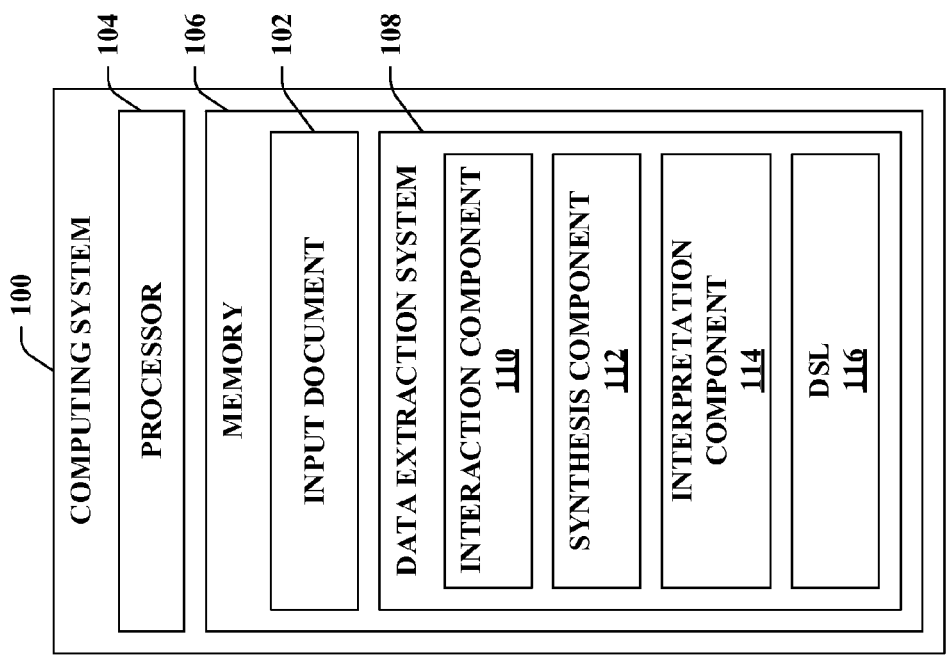
FIG. 1 illustrates a functional block diagram of an exemplary system that controls automated programming for extracting structured data from an input document based on example(s).

Various technologies pertaining to synthesizing and executing an extraction program for extracting structured data from an input document based on examples are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that controls automated programming for extracting structured data from an input document 102 based on example(s). The computing system 100 includes at least one processor 104 and memory 106. The processor 104 is configured to execute instructions loaded into the memory 106 (e.g., one or more systems loaded into the memory 106, one or more components loaded into the memory 106, etc.). As described in greater detail herein, the memory 106 includes a data extraction system 108 executable by the processor 104. The data extraction system 108 is configured to control synthesis and execution of an extraction program (or extraction programs) for extracting the structured data from the input document 102 based on example(s). The memory 106 can further include the input document 102.

Pursuant to various examples, the computing system 100 can be a computing device. Substantially any type of computing device is intended to fall within the scope of the hereto appended claims. Examples of such computing device include a desktop computing device, a mobile computing device (e.g., a mobile telephone such as a smartphone, a laptop computing device, a netbook computing device, a tablet computing device, a wearable computing device, a handheld computing device, a portable gaming device, a personal digital assistant, an automotive computer, etc.), a gaming console, a set-top box, a television, an embedded computing device, or the like.

According to other examples, the computing system 100 can be or include one or more server computing devices. For instance, the computing system 100 can be or include one or more datacenters, where a datacenter includes a plurality of server computing devices. One or more datacenters can alternatively include the computing system 100. Further, the computing system 100 can be a distributed computing system.

The data extraction system 108 allows structured data (e.g., an instance of an output data schema) to be extracted from various input document types that are semi-structured. Moreover, the data extraction system 108 supports a uniform user interaction model across different input document types. Exemplary input document types include text files, log files, word processor documents, semi-structured spreadsheets, webpages, fixed-layout documents (e.g., Portable Document Format (PDF) documents), image files (e.g., optical character recognition may be executed on an image file prior to data extraction on the image file), and so forth. Such input document types can combine model and view, which can enable data to be organized (e.g., possibly hierarchically); however, conventionally it is difficult to extract data from these types of input documents for further manipulation or querying.

The data extraction system 108 leads to improved user efficiency for performing data extraction tasks on the data of the input document 102 as compared to conventional techniques. For instance, a user need not learn how to create a program to extract data from the input document 102. Moreover, a user need not take the time to generate the program to extract data from the input document 102. Furthermore, a user need not understand the underlying formatting details or presentation logic in the input document 102. Further, user interaction performance can be improved in comparison to conventional techniques since the user can provide examples via a uniform user interface (uniform across input document types), and program(s) for extracting data from the input document 102 can be synthesized and executed based on such examples.

The data extraction system 108 can use examples to extract the structured data from the input document 102. The data extraction system 108 can include an interaction component 110 configured to receive examples indicative of data to extract from the input document 102 (e.g., the examples can be received from a user). The examples can specify various fields to be extracted from the input document 102. Further, the interaction component 110 can be configured to relate the fields specified by the examples in a hierarchical organization using structure and sequence constructs. For instance, the interaction component 110 can be configured to receive user input that defines an output data schema, where the output data schema includes a hierarchical combination of structure and sequence constructs.

Examples received by the interaction component 110 can include one or more positive examples and/or one or more negative examples. For instance, at least one example for each construct of the output data schema can be received by the interaction component 110. The examples received by the interaction component 110 can include highlighted regions (e.g., two-dimensional regions) on the input document 102; such highlighted regions can indicate fields to be extracted or structure boundaries (e.g., record boundaries) around related fields.

The interaction component 110 can further be configured to generate a uniform user interface that includes a graphical representation of the input document 102. For instance, fields or structure boundaries within the graphical representation of the input document 102 can be highlighted to provide the examples to the interaction component 110. The uniform user interface is independent of an underlying type of the input document 102 (e.g., due to differing document types having a common two-dimensional presentation layer). Thus, the uniform user interface supported by the interaction component 110 can be uniform across different input document types.

It is contemplated that the examples received by the interaction component 110 can be received from a user of the computing system 100 (e.g., the user provides the examples via input device(s) of the computing system 100, the computing system 100 can include or be coupled with the input device(s)). According to another illustration, the examples received by the interaction component 110 can be received from a client computing device, where a user provides the inputs to the client computing device (e.g., via input device(s) of the client computing device).

The interaction component 110 supports a uniform user interaction model for data extraction from semi-structured input documents across different input document types. A user can initiate data extraction by providing a nested hierarchical definition of data to extract using structure and sequence constructs (e.g., the output data schema). The user can then provide the examples of various data fields and their relationships with each other. By employing the uniform user interaction model for data extraction from examples supported by the interaction component 110, a user need not learn domain-specific scripting technologies to extract data from various input document types. Moreover, the user need not understand an internal data model of the input document 102 and a corresponding representation of the internal data model.

The data extraction system 108 can also include a synthesis component 112 configured to synthesize an extraction program for extracting the data from the input document 102 based on the examples (e.g., the extraction program can be consistent with the examples). The extraction program synthesized by the synthesis component 112 can be in a domain specific language (DSL) 116 corresponding to a type of the input document 102. For instance, if the input document 102 is a text file, then the DSL 116 can be built for text files. The DSL 116 can be constructed from a predefined library of a set of core operators (e.g., map, filter, merge, and pair).

To enable data extraction from the examples, the synthesis component 112 can synthesize programs(s) (e.g., scripts) in an underlying DSL (e.g., the DSL 116, a differing DSL constructed from a predefined library of core operators, etc.). The synthesis component 112 can be provided based on the definition of the DSL 116, where the DSL 116 is defined using the library of core operators (e.g., an inductive synthesis framework can allow the synthesis component 112 to be developed from the definition of the DSL). For each core operator, an inductive synthesis algorithm parameterized by arguments of the operator is provided. The synthesis component 112 can be configured to execute inductive synthesis algorithms for the core operators in the predefined library, and an extraction program can be synthesized by executing the inductive synthesis algorithms. Accordingly, the synthesis component 112 differs from conventional domain specific synthesizers since specialized program synthesis algorithms need not be developed, thereby reducing time and effort associated with creating an inductive synthesizer for a given DSL (only the DSL needs to be provided by the synthesis designer). Thus, a synthesis designer can define a DSL (e.g., the DSL 116) with sufficient expressiveness to provide appropriate abstractions for data extraction for an underlying document type and built out of the operators provided by the core library, and the synthesis component 112 can result due to the inductive synthesis framework; accordingly, specialized program synthesis algorithms need not be developed by the synthesis designer for the synthesis component 112.

According to an illustration, the synthesis component 112 can synthesize a set of potential extraction programs that are consistent with the examples received by the interaction component 110. Following this illustration, the synthesis component 112 can rank the possible extraction programs, and select an extraction program to be utilized based on the rankings. For instance, certain operators in the DSL 116 may be used more frequently as compared to other operators in the DSL 116 (e.g., as determined based on previously synthesized extraction programs); thus, operator frequency for the DSL 116 can influence ranking of the possible extraction programs in the set inferred by the synthesis component 112 from the examples.

The data extraction system 108 can further include an interpretation component 114 configured to execute the extraction program on the input document 102 to extract an instance of the output data schema. The instance of the structured data can be output by the interaction component 110 (or a disparate component of the data extraction system 108) in various formats (e.g., as a table, Extensible Markup Language (XML) file, etc.). Moreover, responsive to execution of the extraction program on the input document 102, the interpretation component 114 can supply information to the interaction component 110; such information can be output as feedback (e.g., highlighting on the input document 102) to enable evaluation (e.g., by the user) concerning whether a correct result for the data extraction has been obtained by executing the extraction program. If the correct result is not obtained, then refining example(s) can be supplied by the user (e.g., received by the interaction component 110). Alternatively, refining examples need not be supplied if the correct result is obtained.

By way of illustration, the interaction component 110 can be configured to receive a refining example subsequent to execution of the extraction program (synthesized based on examples) on the input document 102. The refining example can include an additional highlighted region on the input document 102 or a negative example of a region on the input document 102 not to be highlighted. Following this illustration, the synthesis component 112 can synthesize an updated extraction program for extracting the data from the input document 102 based on the examples and the refining example. Moreover, the interpretation component 114 can execute the updated extraction program on the input document 102 to extract an updated instance of the output data schema.

While not depicted, it is contemplated that the data extraction system 108 can use a set of DSLs, each defined for extraction of a respective input document type (e.g., the DSL 116 can be for synthesizing programs for extracting data from text files, a differing one of the DSLs can be for synthesizing programs for extracting data from webpages, etc.). The DSLs can each be constructed from a predefined library of core operators. Thus, the set of DSLs can be extensible such that additional DSL(s) can be created utilizing the library of the core operators, with the additional DSL(s) being incorporated into the set of DSLs. The synthesis component 112 can be configured to synthesize extraction programs for extracting data from differing types of input documents in differing DSLs (each constructed from the predefined library of the core operators) by executing the inductive synthesis algorithms of the core operators in the predefined library (e.g., domain specific synthesis algorithms need not be developed by a synthesis designer).

Below are three exemplary scenarios pertaining to instantiations of the data extraction system 108 to various domains of input document types. More particularly, the first exemplary scenario pertains to text files, the second exemplary scenario pertains to webpages, and the third exemplary scenario pertains to spreadsheets. It is to be appreciated, however, that the claimed subject matter is not limited to these exemplary scenarios since the data extraction system 108 can additionally or alternatively be utilized for other document types (e.g., other semi-structured document types).

Moreover, many of the examples described herein discuss colors of highlighting (e.g., first color, second color, third color, etc.). It is to be appreciated that terms describing the differing colors such as first, second, third, etc. are not intended to imply any sort of ordering; rather, these terms are used to distinguish between differing colors. Further, it is contemplated that the claimed subject matter is not limited to highlighting using colors; instead, different visual indicators other than color can be used for the highlighting described herein (e.g., differing patterns, visual effects, etc. can be used for the highlighting, etc.).

First Exemplary Scenario

Text Extraction

Figure 2:
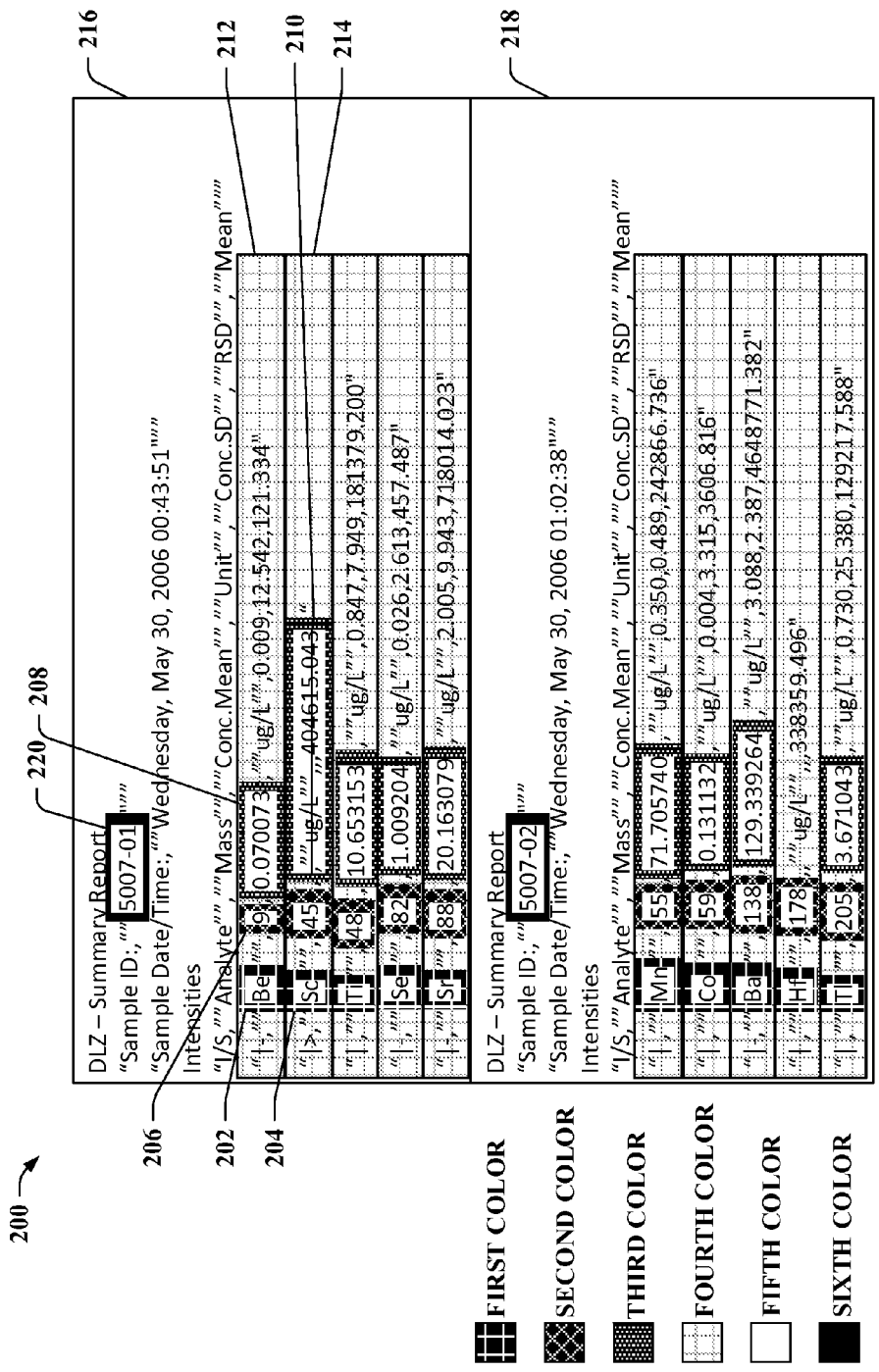
FIG. 2 illustrates an exemplary text file from which data can be extracted based on example(s).

A first exemplary scenario pertains to an exemplary text file 200 as illustrated in FIG. 2. The text file 200 includes a sequence of sample readings, where each sample reading lists various "analytes" and corresponding characteristics (analyte intensities). A user may want to extract highlighted fields shown in FIG. 2 (or a subset of such highlighted fields) into a spreadsheet in order to perform an analysis of the data of such fields. Conventionally, this task can be performed by creating a one-off script, which may be daunting, especially for a non-programmer.

Suppose the user wants to extract the analyte names (regions highlighted in a first color starting with instance "Be") and respective masses of the analytes (regions highlighted in a second color starting with instance "9"). The user can start with the analyte names. She can highlight the first two regions "Be" (region 202) and "Sc" (region 204) as examples in the first color (e.g., two positive examples of a sequence construct in an output data schema can be inputted). The synthesis component 112 can synthesize an extraction program for the analyte names based on the two positive examples, and the interpretation component 114 can execute the extraction program on the text file 200 to highlight other analyte name instances in the text file 200. The user can inspect the highlighted result of the extraction program executed on the text file 200 and determine whether the highlighted result is correct (e.g., whether the highlighted result matches an intended sequence). If the user deems the highlighted result to be correct, she can approve the highlighted result. Thereafter, the user can repeat the foregoing process to extract the mass field using the second color. For instance, the user can highlight the region "9" (region 206) as an example in the second color, and the data extraction system 108 can highlight other mass instances in the text file 200. The data extraction system 108 can automatically relate the instances from the first sequence (analyte names) highlighted in the first color to corresponding instances from the second sequence (masses) highlighted in the second color, and a two-column table can be generated, if desired.

Now suppose the user wants to extract the "Conc. Mean" (regions highlighted in a third color including instance "0.070073"). After receiving one example ("0.070073", region 208 highlighted in the third color), the data extraction system 108 can mistakenly include the string " ""ug/L,,, 404615.043" as part of the highlighted result in the third color as shown in region 210 (this should instead be null). To exclude this region (region 210), the user can mark it as a negative example (which can, for instance, be shown in a user interface by drawing a line through the region 210), and the data extraction system 108 can refine the learning with the new information. The data extraction system 108 can then produce a result that the user deems to be correct, and the user need not provide any further examples. Relating the third sequence to the other two sequences can be more difficult, because the third sequence includes fewer regions as compared to the first and second sequences. However, since the third sequence includes null regions while the other sequences lack null regions, the data extraction system 108 can automatically relate the sequences.

In case the data extraction system 108 cannot relate different field regions, or does so incorrectly, the user can intervene by marking a structure boundary around related regions. For instance, the user may highlight a region 212 in a fourth color as a structure boundary for the intensity of the first analyte (e.g., "Be"). The data extraction system 108 can infer similar regions that group other intensities (e.g., a region 214 for the intensity of the second analyte, etc.). If the user wants to further organize the analyte intensities into different samples, an outer region 216 can be highlighted in a fifth color. Further, the data extraction system 108 can infer a similar outer region 218, which can be highlighted in the fifth color (or the user can alternatively highlight the outer region 218 in the fifth color). The user can then add sample IDs (highlighted in a sixth color, such as "5007-01", region 220) to the structures depicted by the regions 216 and 218.

Once the highlighting process has been completed, an instance of the data structure, including the highlighted data, can be extracted from the text file 200 in various formats (e.g., XML file, spreadsheet table, etc.). Moreover, the extraction program synthesized by the synthesis component 112 can also be outputted. The extraction program can be executed by the interpretation component 114 on other similar files to extract data in the same output format without inputting additional examples; however, it is to be appreciated that additional example(s) can be provided to refine the extraction program when used on a disparate file.

Note that the user can extract data in any field order (one such order was described above). According to another example, a top-down order can be used to extract data from an input document. According to an illustration of a top-down order being employed for the text file 200, the outer regions 216 and 218 in the fifth color can be highlighted before the regions in the fourth color that provide the structure boundary for the intensity for each analyte (e.g., the region 212, the region 214, etc.), which in turn can be highlighted before the regions in the first color (e.g., the region 202, the region 204, etc.), the regions in the second color (e.g., the region 206), and the regions in the third color (e.g., the region 208). The top-down order can provide a higher chance of success (because an inner field can be within a parent field).

Highlighting need not follow an actual file structure of an input document so long as the highlighting is consistent. For instance, the user may set the outer region 216 to begin at "Sample ID", or the region 212 to end in the middle of the line, say before "ug/L" (and other instances of these regions that are inferred and depicted in the highlighted result can have similar beginning or ending positions).

Further, it is contemplated that the data extraction system 108 can be combined with disparate end-user programming technologies. For instance, the data extraction system 108 can be integrated with disparate techniques such that a user can both extract and transform the highlighted fields using examples, and possibly push the changes back to the input document. As an example, after highlighting fields using the data extraction system 108, the user can change a precision of the "Conc. Mean" fields (e.g., regions highlighted in the third color such as the region 208) or a casing of analytes (e.g., regions highlighted in the first color such as the region 202 and the region 204) by leveraging a programming-by-example technology for string transformations.

Second Exemplary Scenario

Webpage Extraction

Figure 3:
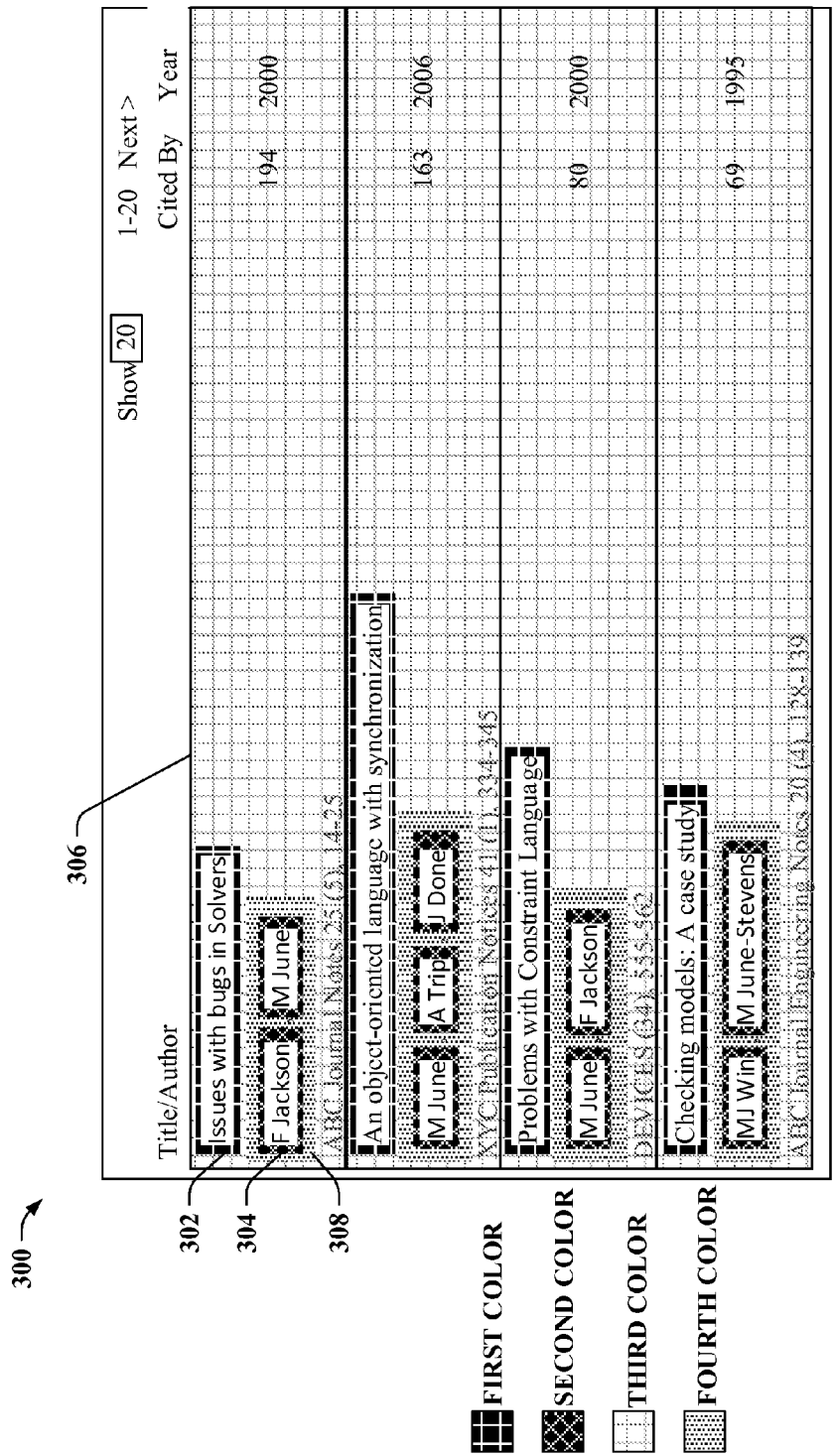
FIG. 3 illustrates an exemplary webpage from which data can be extracted based on example(s).

According to a second exemplary scenario, an exemplary webpage 300 as illustrated in FIG. 3 is considered. The webpage 300 includes a list of publications of an author named Dr. Mary June. For each publication in the list, the webpage 300 includes a title, list of authors, venue, number of citations, and year of publication.

Suppose the user wants to find publication titles in which Dr. June is the first author. The user can use the data extraction system 108 to extract publication title (regions highlighted in a first color such as region 302) and first author (subset of regions highlighted in a second color such as region 304) fields into a spreadsheet, where native spreadsheet functionality can be utilized to count the number of occurrences of a certain instance of a first author field. The interaction component 110 can provide a uniform interaction model independent of the underlying document type. Thus, the user can interact with webpages in the same manner as with text files. Accordingly, examples for the desired fields can be provided by using colored highlighting over the rendered webpage 300, while the user need not understand the underlying structure of the webpage. In contrast, conventional approaches typically rely on a user's understanding of the underlying structure of a webpage.

Now suppose the user wants to extract publication titles along with a list of authors of each publication. Extracting a list of authors may conventionally be challenging because the comma separated list of authors is represented as a string in a single div tag. However, the data extraction system 108 can be used to highlight each author individually. For instance, an underlying DSL used for webpages can be expressive enough to enable extracting a list of regions in a text field of a single HTML node.

The data extraction system 108 can be used to group a publication and its authors together. The user may make this relation explicit by highlighting regions in a third color (e.g., by providing a region 306 as an example in the third color). Additionally or alternatively, regions that group author sequences can be highlighted in a fourth color (e.g., by providing a region 308 as an example in the fourth color). Again, once the synthesis component 112 of the data extraction system 108 produces the extraction program, such extraction program can be executed on other webpages (e.g., to perform the same task for a differing author, etc.).

Third Exemplary Scenario

Spreadsheet Extraction

FIG. 4 illustrates an exemplary semi-structured spreadsheet 400 from which structured data can be extracted. According to the third exemplary scenario, suppose a user wants to (a) add values in an Amount column of the spreadsheet 400 (excluding values in subtotal rows), and (b) plot values in the Amount column grouped by department name.

The user can highlight a few examples of an amount field in a first color (e.g., "$24,500.00"), a department field in a second color (e.g., "Advanced Materials Processing"), and a record boundary in a third color (e.g., three cell by three cell region including "Advanced Materials Processing", "$24,500.00", and "Coffey, Kevin R."). The data extraction system 108 is then able to highlight other similar instances and create a relational table view. For task (a), the values in the Amount column can be added using a native spreadsheet sum function over the relational view (instead of having to write a complicated conditional arithmetic macro over the original semi-structured spreadsheet view). Task (b) can be accomplished using a feature in a spreadsheet application, where the feature automatically suggests relevant charts over user's data. For instance, this feature can rely on the data being formatted as a single relational table, and may not work on the original semi-structured spreadsheet.

If the user later decides to also extract the investigator name in a fourth color, she can provide an example (e.g., "Coffey, Kevin R.") and other instances can be inferred. Similar to before, once the interactions are recorded, the output view can be automatically updated if the user continues to edit and maintain the original ad-hoc format in a consistent manner.

Figure 5:
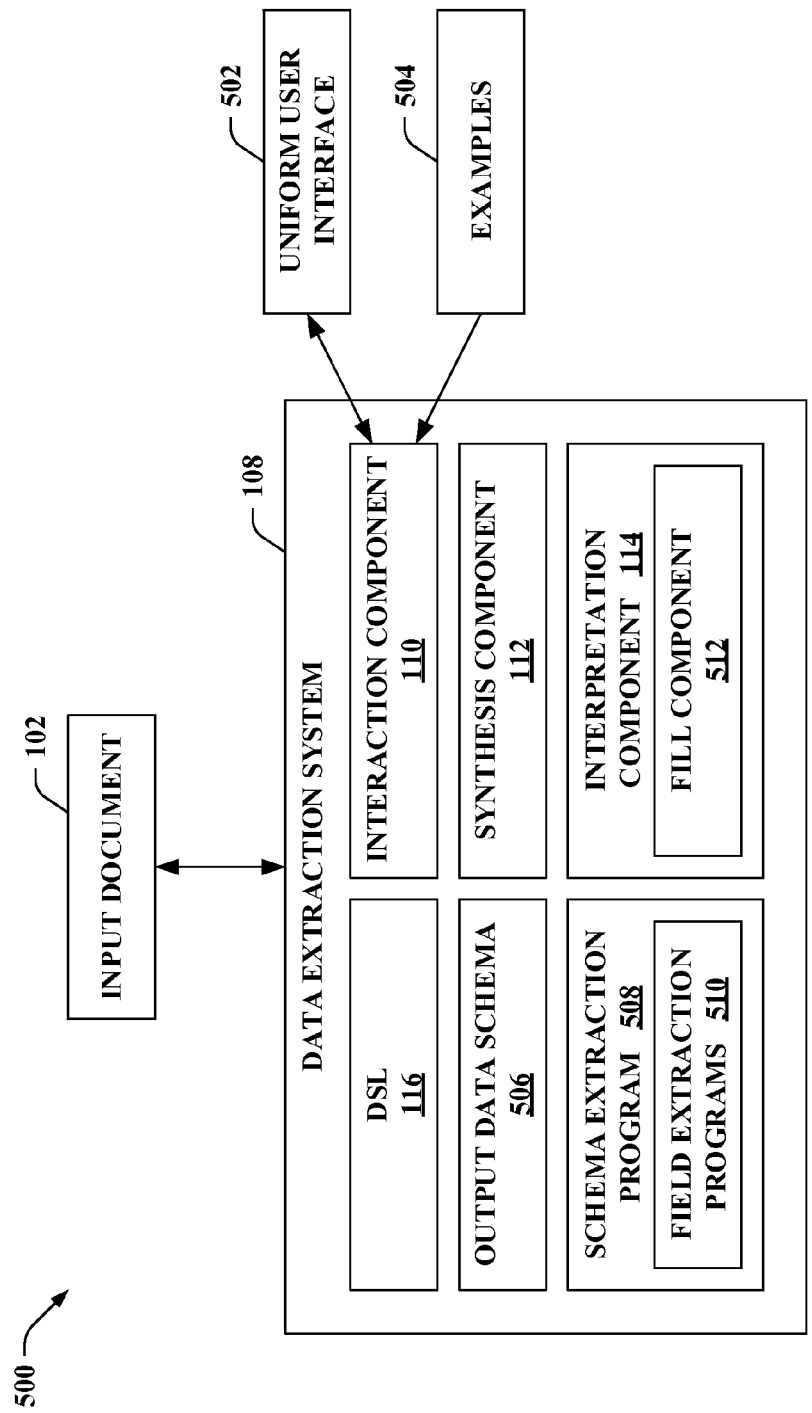
FIG. 5 illustrates a functional block diagram of an exemplary system that supports a uniform user interaction model for extracting data from the input document.

Turning to FIG. 5, illustrated is a system 500 that supports a uniform user interaction model for extracting data from the input document 102. The system 500 includes the data extraction system 108, which can further include the interaction component 110, the synthesis component 112, the interpretation component 114, and the DSL 116 (or plurality of DSLs).

The interaction component 110 can be configured to support a uniform user interface 502. The uniform user interface 502 can be uniform for a variety of input document types. The uniform user interface 502 can include a graphical representation of the data of the input document 102. The uniform user interface 502 can be used to highlight a region(s) over portion(s) of the data of the input document 102. A highlighted region can be rectangular, for instance; however, other shapes are intended to fall within the scope of the hereto appended claims.

The interaction component 110 can further be configured to receive examples 504. The examples 504 can include one or more positive examples and/or one or more negative examples. The examples 504 can be received via the uniform user interface 502; for instance, the uniform user interface 502 can allow for highlighting region(s) on the input document 102 that include data that is to be extracted. Responsive to receipt of an example, the interaction component 110 can incorporate a graphical representation of the example as part of the uniform user interface 502 (e.g., the graphical representation can include a highlighted region over a portion of the data of the input document 102).

Moreover, responsive to execution of an extraction program on the input document 102 by the interpretation component 114, the interaction component 110 can incorporate a graphical representation of an instance of the output data schema extracted from the input document 102 based on the examples over the input document 102 as part of the uniform user interface 502. For instance, the interaction component 110 can incorporate highlighting indicative of the instance of the output data schema over the input document 102 as part of the uniform user interface 502. Further, responsive to execution of an updated extraction program (e.g., synthesized responsive to receipt of a refining example), the interaction component 110 can incorporate a graphical representation of an updated instance of the output data schema extracted from the input document 102 based on the examples and the refining example(s). Such graphical representation again can be incorporated over the input document 102 as part of the uniform user interface 502.

An output data schema 506 can be provided to the data extraction system 108. For instance, the output data schema 506 can be received by the interaction component 110 (e.g., user input specifying the output data schema 506 can be received). Further, the synthesis component 112 can synthesize a schema extraction program 508 based on the examples 504, and the interpretation component 114 can execute the schema extraction program 508 to extract desired data from the input document 102 as an instance of the output data schema 506.

A product of an extraction task performed by the data extraction system 108 can be the instance of the output data schema 506. The output data schema 506 can be a nested description of data organization using standard structure and sequence constructs. An exemplary language for the output data schema 506 is set forth below.

```
Schema M = S|T
Structure T = Struct (identifier: E₁, ..., identifier: Eₙ)
Element E = f|S
Sequence S = Seq(f)
Field f = [Color]τ|[Color]T
```

The output data schema 506 can be either a sequence S over some field f, or a structure T with named elements $E_1, \ldots, E_n$. Each element E corresponds to either a field f or to a sequence S. Each field f is either an atomic type $\tau$ (also referred to as a leaf field) or a structure T. Each field f is associated with a unique color (denoted f.Color).

For example, exemplary output data schemas for two extraction tasks discussed in the first exemplary scenario (e.g., in connection with FIG. 2) are presented below. The first exemplary output data schema represents a sequence of structures highlighted in the fourth color, each of which includes an Analyte field highlighted in the first color and a Mass field highlighted in the second color. The second exemplary output data schema represents organization of more fields referenced in the task illustrated in FIG. 2.

```
(1) Seq([fourth_color]Struct(Analyte: [first_color]Float,
        Mass: [second_color]Int))
(2) Seq([fifth_color]Struct (SampleID: [sixth_color]String,
        Intensities: Seq[fourth_color]Struct(
            Analyte: [first_color]String,
            Mass: [second_color]Int,
            CMean: [third_color]Float))))
```

Note that a sequence is unable to be directly nested inside another sequence as part of the schema language. Rather, a colored structure construct is between such sequences. The structure serves as the boundary for the learning of the inner sequence.

The following defines the term "ancestor" as used herein. A field $f_1$ is an ancestor of a field $f_2$ in an output data schema if $f_2$ is nested inside $f_1$. For notational convenience, $\perp$ refers to a top-level data schema definition, and is an ancestor of every field in the output data schema. Additionally, $f_1$ is a sequence-ancestor of $f_2$ if there is at least one sequence construct in the nesting between $f_1$ and $f_2$. Otherwise, $f_1$ is a structure-ancestor of $f_2$. Moreover, $\perp$ is an ancestor of every other field in the output data schema.

In the second exemplary output data schema above, the fourth color structure is the structure-ancestor of leaf fields Analyte, Mass, and CMean. The top-level structure in the fifth color is the sequence-ancestor of the fourth color structure. Ancestral relationship can be categorized to enable the synthesis component 112 to invoke appropriate synthesis algorithms.

Next, the term "region" as used herein is defined. A region R of a document (e.g., the input document 102) is some two-dimensional portion over the visualization layer of that document that is allowed to be highlighted in some color. The notation f-region is used to denote any region that the user highlights in f.Color. Any region R that is associated with a leaf field (also referred to as a leaf region) has some value associated with it, which is denoted by R.Val. For a document D, the notation D.Region is used to denote the largest region possible in D.

For a text file, a region is represented by a pair of two character positions within the file and includes characters in between the positions (e.g., these positions may or may not be within the same line). The value of such a region is the string of characters in between the positions.

In case of a webpage, a leaf region is represented by either an HTML node (e.g., the value of such region is the text value associated with that node) or a pair of character positions within the text content of an HTML node (e.g., the value of such region is the string of characters in between those positions). A non-leaf region of a webpage is represented by an HTML node.

For a spreadsheet, a leaf region is represented by a single cell (e.g., the value of such region is the content of the cell), while a non-leaf region is represented by a pair of cells. A value of such a non-leaf region is the rectangular region of cells set by the pair of cells.

Next, a definition of "highlighting" is set forth. A highlighting CR of a document D is a collection of colored regions in D. A highlighting can also be viewed as a function that maps a color to regions of that color in D. A highlighting CR is consistent with a data schema M (e.g., the output data schema 506) if the following conditions hold. 1) For any two regions (in CR), either they don't overlap or one is nested inside the other. 2) For any two fields $f_1$ and $f_2$ in M such that $f_1$ is an ancestor of $f_2$, each $f_2$-region $R_2$ is nested inside some $f_1$-region $R_1$. 3) For any two fields $f_1$ and $f_2$ in M such that $f_1$ is a structure-ancestor of $f_2$, there is at most one $f_2$-region inside a $f_1$-region. 4) For every leaf field f in M, the value of any f-region in CR is of type f.

The synthesis component 112 can synthesize field extraction programs 510 for individual fields. The synthesis component 112 can combine the field extraction programs 510 into the schema extraction program 508 following the structure imposed by the output data schema 506. The synthesis component 112 can use the structure of the output data schema 506 to simplify the learning of individual fields. For instance, a field f can be related to one of its ancestors, whose field extraction program (in case of a non-$\perp$ ancestor) defines learning boundaries for f (e.g., each f-region resides inside one of these boundaries).

As described herein, a schema extraction program Q (e.g., the schema extraction program 508) for a given output data schema M (e.g., the output data schema 506) is represented as a map from each field f in M to a field extraction program, denoted Q(f), (e.g., from the field extraction programs 510). Moreover, a field extraction program (e.g., one of the field extraction programs 510) of a field f is a pair (f', P), where f' (possibly $\perp$) is some ancestor field of f and P is either a Sequence-Region program that extracts a sequence of f-regions from inside a given f'-region (e.g., when f' is a sequence-ancestor of f) or is a Region program that extracts a single f-region from inside a given f'-region (e.g., when f' is a structure-ancestor of f).

The interpretation component 114 can be configured to execute the schema extraction program 510. According to an illustration, the interpretation component 114 can perform the algorithm set forth in the following pseudo code to execute the schema extraction program 510. It is to be appreciated, however, that the claimed subject matter is not limited to the example described in this pseudo code. Moreover, other exemplary pseudo code set forth herein is similarly provided for illustration purposes.

```
function Run (schema extraction program Q, schema M, document
    D): schema instance is
1.    CR := ∅
2.    foreach field f in M in top - down topological order do
3.        R̃:= Run (Q (f), D, CR)
4.        CR := CR ∪ {(f.Color, R)|R ∈ R̃}
5.    if CR is inconsistent with M then return ⊥
6.    else return Fill (M, D. Region)
function Run (extracton program (f', P)of field f, document D,
highlighting CR): f - regions is
7.    R̃' := (f' =⊥)? {D.Region}: CR[f'.Color]
8.    return ∪_{R'∈R̃'} [[P]] R' /*    execute P on R' */
```

Following this illustration, the interpretation component 114 can execute a field extraction program (from the field extraction programs 510) corresponding to each field f in a top-down order and update the document highlighting CR using the returned list of f-regions R̃ (lines 2-4). For each field f, the interpretation component 114 can find a set of regions R̃' determined by the ancestor f' (line 7), and then compute f-regions by executing the field extraction program on each region R' in R̃' (line 8). Once CR has been constructed, the interpretation component 114 can generate an instance of the output data schema 506 from the nesting relationship defined in the output schema M, using a fill component 512 (e.g., using a Fill function (line 6)).

A schema construct and a region can be inputted to the fill component 512. Further, the fill component 512 can be configured to output a schema instance. Set forth below are exemplary semantics of the Fill function that can be implemented by the fill component 512.

```
Fill(Struct(id_1E_1, ... , id_nE_n), R) = new
    Struct({id_1 = Fill(E_1, R), ... , id_n = Fill(E_n, R)})
Fill(Seq(f), R) = new
    Seq(Map(λ R': Fill(f, R'), Subregions(R, CR[f.Color]))
Fill ([Color]Val, R) = Subregion(R, CR[Color]).Val
Fill ([Color]T, R) = Fill(T, Subregion(R, CR[Color]))
Fill(_, ⊥) =⊥
```

The semantics of the Fill function can be defined recursively. Each definition can take a schema construct and a region corresponding to one of its ancestor fields, and return a schema instance by recursively applying Fill functions on its descendants. CR[c] returns regions whose color is c. Subregions(R, R̃) returns the ordered set of regions from R̃ that are nested inside R. Subregion(R, R̃) returns the region from R̃ that is nested inside R; if no such region exists, ⊥ is returned. Note that if CR is consistent with M, there is at most one such region. Moreover, it is to be appreciated that the interpretation component 114 (or a disparate component of the data extraction system 108) can check nestedness of two regions.

The following sets forth an exemplary user interaction with the data extraction system 108 to extract desired data from the input document 102. The user can input the output data schema 506. Then, for each field f in the output data schema 506 (in an order determined by the user), the user can input a sufficient number of examples of field instances of field f by highlighting appropriate regions in the input document 102 (e.g., included as part of the uniform user interface 502) using f.Color.

When the user provides one or more examples for a field f, the synthesis component 112 synthesizes a field extraction program (e.g., one of the field extraction programs 510) for field f that is consistent with the provided examples. Further, the interpretation component 114 executes the field extraction program to identify and highlight other regions in f.Color. If the user is satisfied with the inferred highlighting, she can commit the results (the field f is said to have been materialized at that point of time), and then proceed to another (non-materialized) field. Otherwise, the user may provide any additional example(s).

As set forth herein, a field f can be considered to have been simplified if there exists a materialized field f' such that f' is a structure-ancestor of f. The examples for a non-simplified field can include positive instance(s) and optionally negative instance(s) of region(s) that lie completely within the region(s) of an immediate ancestor field that has been materialized. If the user is not satisfied with the inferred highlighting, the user provides additional positive instance(s) (e.g., region(s) that have failed to be highlighted) or negative instance(s) (e.g., unintended region(s) that have been highlighted) and the synthesis process can be repeated by the synthesis component 112. The examples for a simplified field can include a single positive instance (possibly null) inside each region of the immediate ancestor field that has been materialized. If the user is not satisfied with the inferred highlighting, the user provides additional examples and the synthesis process is repeated by the synthesis component 112.

The synthesis component 112 can implement the following exemplary algorithm (SynthesizeFieldExtractionProg) to synthesize a field extraction program as part of the example-based interaction described above.

```
function SynthesizeFieldExtractionProg(Document D,
    Schema M, Highlighting CR, Field f, Regions R̃_1, Regions R̃_2) is
/* R̃_1, R̃_2 denote positive, negative instances */
1.    foreach ancestor field f' of f in schema M do
2.        if f' isn't materialized ∧ f' ≠⊥ then continue
3.        R̃ := (f' =⊥)? {D. Region}: CR[f'. Color]
4.        if f' is a sequence - ancestor of f then
5.            ex := ∅
6.            foreach R ∈ R̃ s. t. Subregions(R, R̃_1 ∪ R̃_2) ≠ ∅ do
7.                ex := ex ∪
                    {(R, Subregions(R,R̃_1), Subregions(R, R̃_2))}
8.            P̃ := SynthesizeSedRegionProg(ex)
9.        else /* f' is a structure - ancestor of f */
10.           ex := ∅
11.           foreach R ∈ R̃ s. t. Subregions(R,R̃_1) ≠⊥ do
12.               ex := ex ∪ {(R, Subregion(R,R̃))}
13.           P̃ := SynthesizeRegionProg(ex)
14.       foreach P ∈ P̃ do
15.           CR' := CR ∪ {(f. Color, R)|R ∈ [[P]]R', R' ∈ R̃
16.           if CR' is consistent with M then return (f', P)
17.   return ⊥
```

Input for the foregoing algorithm performed by the synthesis component 112 includes a document D, a schema M, a highlighting CR of the document that is consistent with M, a non-materialized field f, a set of positive instances R̃_1, and a set of negative instances R̃_2 (which is empty in case field f has been simplified). Responsive to implementing this algorithm, the synthesis component 112 can output a program P such that (a) P is consistent with the examples and (b) the updated highlighting that results from executing P is consistent with the schema M.

In the above pseudo code for the algorithm that synthesizes the field extraction program, at line 2, a suitable ancestor f' can be identified from CR that forms the learning boundary for f. The loops at lines 6 and 11 group the input examples into boundaries imposed by f'-regions. Depending on the relationship between f and f', either a sequence synthesis component or a structure synthesis component can be invoked. In particular, the sequence synthesis component (e.g., SynthesizeSeqRegionProg) can be invoked (at line 8) to learn a program for extracting a sequence of f-regions in a f'-region (e.g., if f' is a sequence-ancestor of f), or the structure synthesis component (e.g., SynthesizeRegionProg) can be invoked (at line 13) to learn a program for extracting a single f-region in an f'-region (if f' is a structure-ancestor of f). Both the sequence synthesis component and the structure synthesis component can return a set of programs. Moreover, the loop at line 14 selects the first program P in this sequence (if it exists) that ensures that the updated highlighting that results from executing P is consistent with the schema M.

The data extraction system 108 enables extraction of various fields of the input document 102 in substantially any iteration order employed by a user (e.g., the interaction component 110 can receive the examples in a user-selected iteration order over fields of the output data schema 506). Such flexibility enables the user to dynamically decide to update the output data schema 506 (e.g., extract more fields). Iterating over fields in a bottom-up order causes the data extraction system 108 to guess the organization of leaf field instances by looking at their relative order (thereby obviating the need to provide examples for any non-leaf field). While this may be successful in many cases, it may not be able to handle cases where field instances may be null. On the other hand, iterating over fields in a top-down topological order typically involves the user providing examples for each field (including non-leaf fields). However, the top-down iteration order can provide various advantages compared to the bottom-up iteration order. For instance, the top-down approach can provide visualization for the user to inspect the results of the organization of various non-leaf field instances. Moreover, the top-down approach can provide a greater chance of success since the synthesis tasks for a field can be enabled relative to any ancestor field as opposed to the entire document. Further, the top-down approach can involve providing fewer examples for a field that is nested inside another field whose instances have been identified. Hence, if the leaf field instances are not null and the user does not need help with identifying representative examples, the user may provide few examples for each leaf field and the data extraction system 108 may be able to automatically infer the organization of the various leaf field instances.

Figure 6:
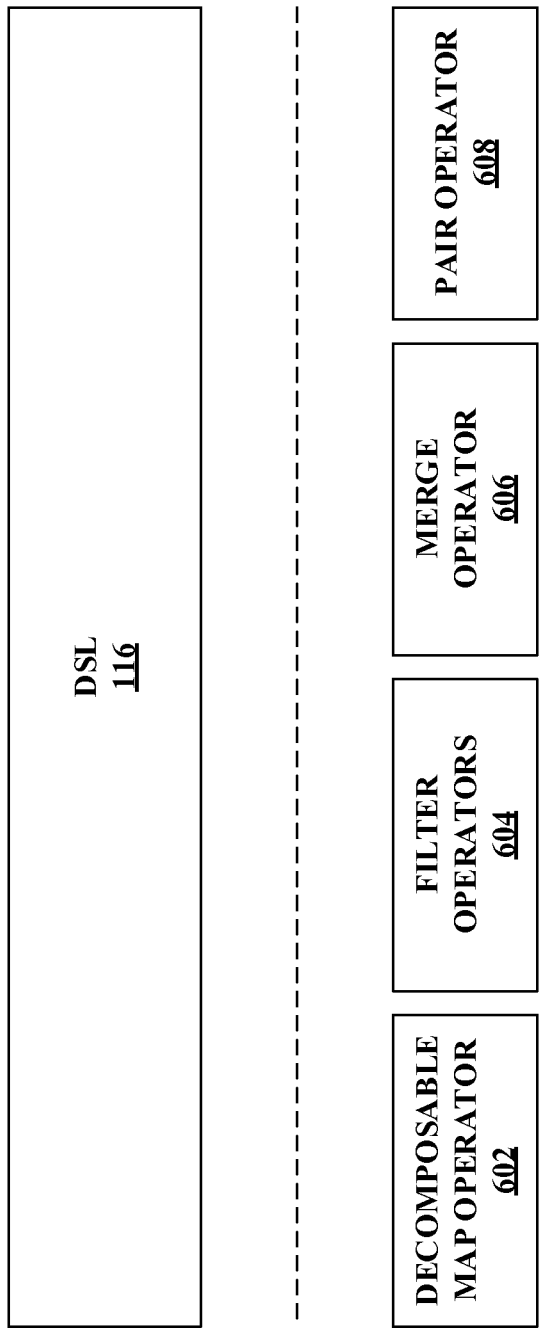
FIG. 6 illustrates an exemplary domain specific language (DSL) built based on a predefined library of core operators.

FIG. 6 illustrates the DSL 116 for data extraction in greater detail. The DSL 116 can be represented by a tuple (G, $N_1$, $N_2$). G is a grammar that defines data extraction strategies. Moreover, the DSL 116 includes definitions for various non-terminals N. Each non-terminal N is defined as a ranked collection of rules (also referred to as N.RHSs) of the same type. The type of a non-terminal is the type of its rules. A rule includes a fixed expression or an operator applied to other non-terminals of appropriate types or fixed expressions. The type of a rule is the return type of the fixed expression or the operator that constitutes the rule.

A non-terminal can be referred to as synthesizable if each of its rules (a) involves a core operator of a predefined library applied to fixed expressions or synthesizable non-terminals, (b) involves an operator that is equipped with an inductive synthesis algorithm of its own (e.g., domain-specific operators), or (c) includes fixed expressions. $N_1$ can be a distinguished (top-level) synthesizable non-terminal of type sequence of regions. $N_2$ can be another distinguished (top-level) synthesizable non-terminal of type region.

An expression generated by a non-terminal of type T can be viewed as a program with return type T. Note that the expressions generated by $N_1$ represent Sequence-Region programs and expressions generated by $N_2$ represent Region programs. Expressions of the DSL 116 can include a distinguished free variable $R_0$ (of type Region) that denotes the input to the top-level Sequence-Region or Region programs. Moreover, if an expression of the DSL 116 includes another free variable, such free variable is bound to a lambda definition that occurs in a higher level expression.

A state σ of a program P is an assignment to free variables in P. The following sets forth notation used below. The notation $\{x \leftarrow v\}$ represents a state that maps variable x to value v. The notation σ[v/x] denotes setting the value of variable x to value v in an existing state σ. The notation [[P]]σ denotes the result of executing the program P in state σ.

The data extraction DSL 116 can be constructed from a library of core operators. While FIG. 6 shows one DSL constructed from the core operators, namely the DSL 116, it is contemplated that a plurality of data extraction DSLs for various document types can be constructed from the library of core operators. The exemplary library of core operators described herein includes a decomposable map operator 602, filter operators 604, a merge operator 606, and a pair operator 608. The pair operator 608 (which returns a scalar) can be a scalar expression, while the other operators (which return a sequence) can be sequence expressions. However, other libraries of core operators are intended to fall within the scope of the hereto appended claims.

The decomposable map operator 602 can have two arguments λx: F and S, where S is a sequence expression of type List⟨T⟩, and F is an expression of type T' and uses an additional free variable x. The return type of Map is List⟨T'⟩. Map (λx: F, S) can have semantics such that it applies function F to each element of the sequence produced by S to construct a resultant sequence. The following further describes the decomposable map operator 602.

$$[[Map(\lambda x{:}F,S)]]\sigma = [t_0, \ldots, t_n], \text{ where}$$

$$n = |Y'-1|, t_i = [[F]](\sigma[Y'[i]/x]), Y' = [[S]]\sigma$$

A map operator is decomposable with respect to an underlying DSL (e.g., the DSL 116), which defines the language for F and S, if such operator has the following property—for any input state σ and a sequence Y, there exists a sequence Z such that:

$$\forall F,S{:} Y \subseteq [[Map(F,S)]]\sigma \Rightarrow Z \subseteq [[S]]\sigma \wedge [[Map(F,Z)]]$$
$$\sigma = Y$$

In the foregoing, ⊆ denotes the subsequence relationship. Decompose can be a function that computes a witness Z, given σ and Y. This function can have the following signature:

$$\text{Map.Decompose:} (\text{Region} \times \text{List}\langle T \rangle) \rightarrow \text{List}\langle T \rangle$$

The Decompose function can reduce examples for the map operator to the examples for arguments F and S, thereby reducing the task of learning the desired map expression from examples to the sub-tasks of learning F and S expressions from respective examples.

According to an example, the core operators can include two kinds of filter operators 604 that operate over sequences. Following this example, one of the filter operators 604 can select elements based on properties of the elements (referred to herein as a FilterBool operator). Further following this example, the other one of the filter operators 604 can select elements based on corresponding indexes (referred to herein as a FilterInt operator). Moreover, it is contemplated that the two kinds of filter operators 604 can be composed to enable sophisticated filtering operations; yet, the claimed subject matter is not so limited.

A FilterBool operator can have two arguments $\lambda x$: B and S, where S is a sequence expression of type List⟨T⟩, and B is a Boolean expression and uses an additional free variable x. The return type of FilterBool is List⟨T⟩. FilterBool($\lambda x$: F, S) can have filtering semantics such that it selects elements from S that satisfy B. For example, if S is the set of lines of the text file 200 depicted in FIG. 2, then the expression FilterBool($\lambda x$: EndsWith([Number, Quote], x), S) selects lines in the fourth color. The predicate EndsWith ([Number, Quote], x) returns true if a string x ends with a number followed by a double quote.

A FilterInt operator can have three arguments: a non-negative integer init, a positive integer iter, and a sequence expression S. The return value can have the same type as that of S. The FilterInt operator takes iter elements from S starting from init as the first element. Semantics of the FilterInt operator can be as follows:

[[FilterInt(init,iter,S)]]σ=let L=[[S]]σ in

Filter($\lambda x$:(indexof(L,x)−init)% iter=0,L)

For example, FilterInt(1,2,S) can select elements at odd indices from a sequence.

The merge operator 606 can take as input a set of n sequence expressions, each of which is generated by the same non-terminal A (of some type of the form List⟨T⟩). A return value of Merge can also have the same type as that of A. The merge operator 606 can combine results of the n expressions together. Such combination can be useful when a single expression cannot extract a set of intended regions. The merge operator 606 is a disjunctive abstraction and can allow extraction of multiple-format field instances by merging several single-format field instances. Semantics of the merge operator 606 can be as follows:

[[Merge($A_1$, . . . ,$A_n$)]]σ=MergeSeq ([[$A_1$]]σ, . . . ,[[$A_n$]]σ)

In the foregoing, the MergeSeq operation can merge its argument sequences with respect to an order of elements' locations in the original file.

The pair operator 608 can have two arguments A and B. Moreover, the pair operator 608 can have the following semantics:

[[Pair(A,B)]]σ=([[A]]σ,[[B]]σ)

The pair operator 608 can allow constructing region representations from elements. For example, a text region can be created from a pair of its start and end positions.

Figure 7:
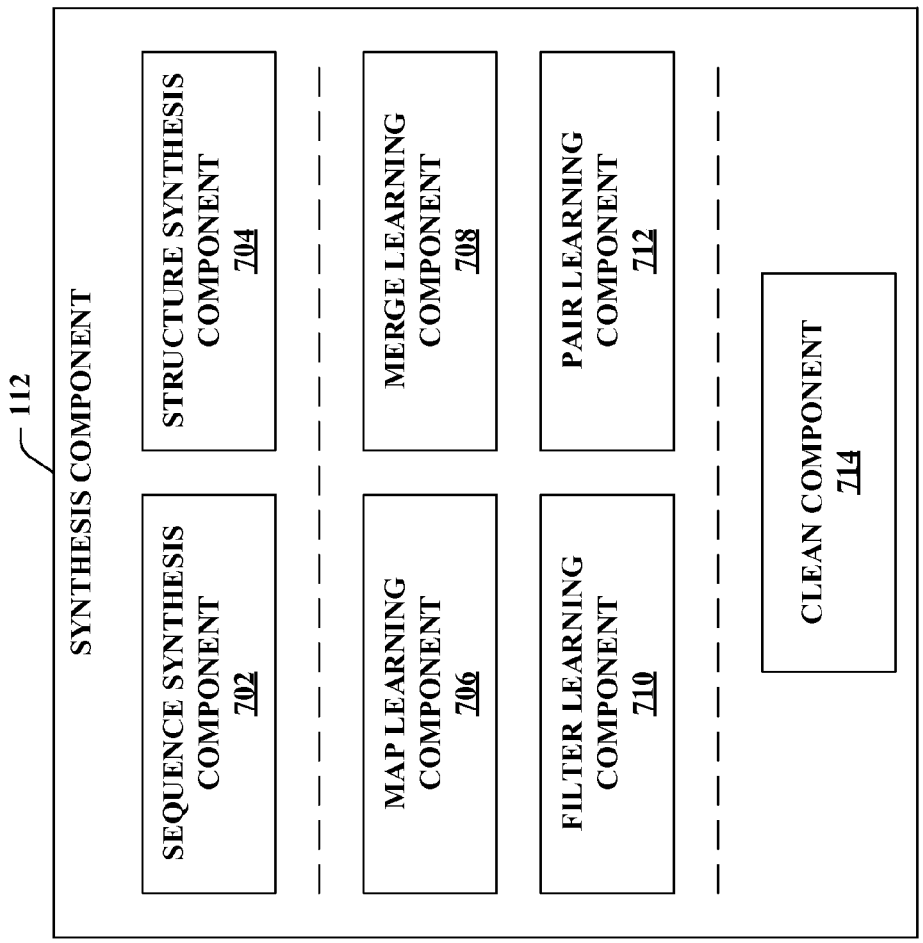
FIG. 7 illustrates a functional block diagram of an exemplary synthesis component that enables an example-based user interaction model.

Referring now to FIG. 7, illustrated is the synthesis component 112 in greater detail. The synthesis component 112 can synthesize an extraction program in a DSL corresponding to a type of an input document from which data is being extracted. The synthesis component 112 can employ modular synthesis algorithms, which enables automatic generation of synthesis algorithms for a DSL that is constructed using the predefined library of core operators.

The synthesis component 112 includes a sequence synthesis component 702 and a structure synthesis component 704. As noted above, depending on a relationship between an input region (f-region) and its ancestor (f'-region), the synthesis component 112 can either employ the sequence synthesis component 702 or the structure synthesis component 704 to learn an extraction program. Both the sequence synthesis component 702 and the structure synthesis component 704 can output an ordered set of programs in the DSL, each of which is consistent with provided examples.

The sequence synthesis component 702 can learn a program for extracting a sequence of f-regions in a f'-region (e.g., if f' is a sequence-ancestor of f). A set of examples can be inputted to the sequence synthesis component 702 (e.g., SynthesizeSeqRegionProg). Each set of examples inputted to the sequence synthesis component 702 can include a triple (R, $\tilde{R}_1$, $\tilde{R}_2$), where R denotes the input region, $\tilde{R}_1$ denotes positive instances of the regions to be highlighted within R, and $\tilde{R}_2$ denotes negative instances of the regions not to be highlighted within R.

Moreover, the structure synthesis component 704 can learn a program for extracting a single f-region in an f'-region (if f' is a structure-ancestor of f). A set of examples, each of which includes a pair (R, R') can be inputted to the structure synthesis component 704. In the foregoing, R denotes the input region and R' denotes the output region.

Below is exemplary pseudo code for the sequence synthesis component 702 (e.g., SynthesizeSeqRegionProg).

```
function SynthesizeSeqRegionProg (
  Set⟨(Region, List⟨Region⟩,
  List⟨Region⟩)⟩ Q): List⟨Prog⟩ is
1.    Q' := {({R_0 ← R},R̃_1)|(R, R̃_1, R̃_2) ∈ Q}
2.    /* learn with positive examples */
3.    P̃ := N_1. Learn(Q')   /* start symbol for sequence */
4.    P̃' := [ ]
5.    foreach P ∈ P̃ do
6.      if (∃(R, R̃_1, R̃_2) ∈ Q: ([[P]]{R_0 ← R}) ∩ R̃_2 ≠ ∅)then
7.        continue   /* violate negative instances */
8.      P̃' := P̃' :: P
9.    return P̃'
```

As shown above, the sequence synthesis component 702 can first learn from only positive instances by invoking a learn method of the top-level sequence non-terminal $N_1$ (line 3). Then, the sequence synthesis component 702 can select programs that additionally satisfy the negative instances constraint (loop at line 5). The operator::appends an element to a list.

Exemplary pseudo code for the structure synthesis component 704 (e.g., SynthesizeRegionProg) is now provided.

```
function SynthesizeRegionProg (Set⟨(Region,
  Region)⟩ Q):
  List⟨Prog⟩ is
1.    Q' := {({R_0 ← R}, R')|(R, R') ∈ Q}
2.    return N_2. Learn(Q')   /* start symbol for region */
```

As set forth in the above pseudo code, the structure synthesis component 704 can invoke a learn method of the top-level region non-terminal $N_2$ (line 2).

Next, exemplary pseudo code for the learn method invoked by the sequence synthesis component 702 or the structure synthesis component 704 is described.

```
function N. Learn (Set⟨(State, T)⟩Q):
List⟨Prog⟩ is
1    P̃ := [ ]
2.   foreach C ∈ N. RHSs do
3.       P̃ := P̃++C. Learn(Q)
4.   return P̃
```

The learn method for a non-terminal N can involve invoking a corresponding learn method associated with its various rules (line 3) and then returning the ordered union of the sequences of the programs synthesized for each. The operator ++ performs list concatenation.

The synthesis component 112 can include a map learning component 706, a merge learning component 708, a filter learning component 710, and a pair learning component 712 (collectively referred to as learning components 706-712). The learning components 706-712 correspond to the core operators of the library from which the DSL is built. The learning components 706-712 can implement respective learn methods for the operators that constitute the various rules. The learn methods can be defined in terms of the learn methods of their arguments; thus, the learning components 706-712 can yield inductive synthesis algorithms for any data extraction DSL built using the library of core operators.

The map learning component 706 can be configured to yield an inductive synthesis algorithm for a decomposable map operator. Below is exemplary pseudo code for the map learning component 706 (e.g., Map.Learn).

```
function Map. Learn (Set⟨(State,
List⟨T⟩)⟩Q): List⟨Prog⟩ is
/* Let F and S be the function and sequence
arguments of Map.*/
1.   Let Q be {(σ_j, Y_j)}_{1≤j≤m}
2.   for j := 1.. m do        /* find witnesses Z */
3.       Z_j := Map.Decompose(σ_j, Y_j)
4.   Q_1 := {(σ_j[Z_j[i]/x], Y_j[i])|0 ≤ i < len(Z_j), 1 ≤ j ≤ m}
5.   P̃_1 := F. Learn(Q_1)      /* Learn Map's function F */
6.   Q_2 := {(σ_j, Z_j)|1 ≤ j ≤ m}
7.   P̃_2 := S. Learn(Q_2)      /* Learn Map's sequence S */
8.   P̃ := [ ]
9.   foreach P_1 ∈ P̃_1 do
10.      foreach P_2 ∈ P̃_2 do
11.          P̃ := P̃ :: "Map (P_1,P_2)"
12.  return CleanUp (P̃, Q)
```

As provided in this pseudo code, the map learning component 706 can find a witness $Z_j$ for each example $(σ_j, Y_j)$ using the operator's Decompose method (line 3). This allows splitting the problem of learning a map expression into two independent sub-problems, namely learning of a scalar expression F (line 5), and learning of a sequence expression S (line 7) from appropriate examples. The returned result can be an appropriate cross-product style composition of the results returned from the sub-problems (line 12).

The merge learning component 708 can be configured to yield an inductive synthesis algorithm for a merge operator. Exemplary pseudo code for the merge learning component 708 (e.g., Merge.Learn) is now provided.

```
function Merge. Learn (Set⟨(State,
List⟨T⟩)⟩Q): List⟨Prog⟩ is
/* Let A be the non - terminal that forms arguments of Merge.*/
1.   Let Q be {(σ_j, Y_j)}_{1≤j≤m}
2.   /* X holds possible subsets of examples */
3.   X := {Q'|Q' = {(σ_j, Y_j')}_{1≤j≤m'}
         ∀1 ≤ j ≤ m: Y_j' ⊑ Y_j, A. Learn(Q') ≠ [ ]}
4.   Y := ∪_{(σ_j, Y_j')∈Q'} Y_j'   /* positive examples */
     /* T includes partitions that cover examples */
5.   T := {X'|X' is a minimal subset of X s. t.
         {Y_j'|(σ_j, Y_j') ∈ Q', Q', ∈ X'}
6.   P̃ := [ ]
7.   foreach X' ∈ T ordered by size do
8.       Let Q'_1 ... , Q'_n be the various elements of X'
9.       P̃_1, ... , P̃_n := A. Learn(Q'_1), ... , A. Learn (Q'_n)
10.      P̃ := P̃++{"Merge(P_1, ... , P_n)"|∀1 ≤ i ≤ n: P_i ∈ P̃_i}
11.  return CleanUp (P̃, Q)
```

As set forth in the above pseudo code for the merge learning component 708, partitioning of the examples can be considered. The learn method of the argument for each partition can return a non-empty result. The set T (at line 5) holds such partitions. For each such partition (loop at line 7), the learn method of the argument can be invoked for each class in the partition (line 9), and then the results can be combined.

The filter learning component 710 can be configured to yield inductive synthesis algorithms for the filter operators (e.g., FilterBool, FilterInt). Below is exemplary pseudo code for the filter learning component 710 (e.g., FilterBool.Learn and FilterInt.Learn).

```
function FilterBool. Learn (Set⟨(State, List⟨T⟩)⟩Q):
List⟨Prog⟩ is
/* Let B and S be the predicate and sequence arguments of
FilterBool.*/
1.   P̃_1 := S. Learn(Q)       /* learn sequence S */
2.   Q' := {(σ[Y[i]/x], True)|(σ, Y) ∈ Q, 0 ≤ i < len(Y)}
3.   P̃_2 := B. Learn(Q')      /* learn filter B */
4.   P̃ := [ ]
5.   foreach P_1 ∈ P̃_1 do
6.       foreach P_2 ∈ P̃_2 do
7.           P̃ := P̃ :: "FilterBool(P_1,P_2)"
8.   return CleanUp (P̃, Q)
```

As part of the learn method for FilterBool, the filter learning component 710 can independently learn an ordered set $\tilde{P}_1$ of sequence expressions (line 1) and an ordered set $\tilde{P}_2$ of Boolean expressions (line 3) that are consistent with the given examples. The returned result can be a cross-product style composition of the sub-results $\tilde{P}_1$ and $\tilde{P}_2$.

```
function FilterInt. Learn (Set⟨(State, List⟨T⟩)⟩Q):
List⟨Prog⟩ is
/* Let S be the sequence argument of FilterInt.*/
1.   Let Q be {(σ_j, Y_j)}_{1≤j≤m}
2.   P̃_1 := S. Learn(Q)       /* learn sequence S */
3.   P̃ := [ ]
4.   foreach P_1 ∈ P̃_1 do
5.       init := ∞
6.       iter := 0
7.       for j := 1 ... m do
8.           Z_j := [[P_1]]σ_j
9.           init := Min (init, indexof(Z_j, Y_j [0]))
10.          for i := 0 ... |Y_j| - 2 do
11.              t := indexof(Z_j, Y_j[i + 1]) - indexof(Z_j, Y_j[i])
12.              if iter = 0 then iter := t
13.              else iter := GCD(iter, t)
14.          if iter = 0 then iter := 1
15.          P̃ := P̃ :: "FilterInt(init,iter,P_1)"
16.  return CleanUp (P̃, Q)
```

As part of the learn method for FilterInt, the filter learning component 710 can learn an ordered set $\tilde{P}$ of sequence expressions (line 2) that are consistent with the given examples. Then, for each such program, the filter learning component 710 can learn the filtering logic (e.g., strictest filtering logic) that filters a minimum number of elements while staying consistent with the examples. In particular, init can be selected to be the minimum offset (across examples) of the first element in $Y_j$ in the sequence $Z_j$ returned by the executing sequence program in the example state $\sigma_j$ (line 9). The filter learning component 710 can select iter to be the greatest common divisor (GCD) of distances between indices of any two contiguous elements of $Y_j$ in $Z_j$ (line 13).

The pair learning component 712 can be configured to yield an inductive synthesis algorithm for the pair operator. Below is exemplary pseudo code for the pair learning component 712 (e.g., Pair.Learn).

```
function Pair. Learn (Set⟨(State,
(T₁,T₂))⟩ Q): List⟨Prog⟩ is
/* Let A and B be the two arguments of Pair.*/
     1.      Let Q be {(σⱼ, (uⱼ, u'ⱼ))}₁≤ⱼ≤n
     2.      Q₁ := {(σⱼ, uⱼ)}₁≤ⱼ≤n; Q₂ := {(σⱼ, u'ⱼ)}₁≤ⱼ≤n
     3.      P̃₁ := A. Learn(Q₁)
     4.      P̃₂ := B. Learn(Q₂)
     5.      if P̃₁ = ∅ or P̃₂ = ∅ then return [ ]
     6.      P̃ := [ ]
     7.      foreach P₁ ∈ P̃₁ do
     8.          foreach P₂ ∈ P̃₂ do
     9.              P̃ := P̃ :: "Pair(P₁,P₂)"
    10.      return P̃
```

The pair learning component 712 can invoke the learn method of the first (second) argument at line 3 (line 4) to learn programs that can compute the first (second) element in various output pairs in the examples from the respective inputs. The final result can be produced by taking a cross-product of the two sets of programs that are learned independently (loop at line 7).

The synthesis component 112 can further include a clean component 714 configured to remove a subset of programs from a set of programs learned by the map learning component 706, the merge learning component 708, or the filter learning component 710. Exemplary pseudo code for the clean component 714 (e.g., CleanUp) is now provided.

```
function CleanUp(List⟨Prog⟩ P̄,Set⟨(State,
List⟩T⟩)⟩ Q): List⟨Prog⟩ is
     1.      P̃' := [ ]
     2.      foreach i = 1 to |P̃|do
     3.          P := P̃[i]
     4.          incl := true
     5.          foreach k =1 to |P̃| do
     6.              if (P̃[k] subsumes P w. r. t. Q) and ((P does not
                    subsume P̃[k] w. r. t. Q) or k < i) then incl := false
     7.          if (incl = true)then P̃' := P̃' :: P
     8.      return P̃'
```

The clean component 714 can enhance performance and ranking optimization employed by the learn methods of various operators (e.g., the map learning component 706, the merge learning component 708, and the filter learning component 710). The clean component 714 can remove those programs that extract more regions than some retained program. More particularly, the clean component 714 can remove the (lower-ranked) programs from an ordered set of programs that are subsumed by some unremoved program (loop at line 5). Note that this does not affect the completeness property associated with the various learning methods.

Further, the clean component 714 can implement a ranking criterion that assigns higher likelihood to the scenario wherein the user provides consecutive examples from the beginning of any immediately enclosing ancestral region (as opposed to providing arbitrary examples that are not consecutive or are from the middle of the document).

The following defines the term "consistency" as used herein. A scalar program P (e.g., a program that returns a scalar value) is said to be consistent with a set $Q=\{(\sigma_j, u_j)\}_j$ of scalar examples if $\forall j: u_j=[[P]]\sigma_j$. A sequence program P (e.g., a program that returns a sequence) is said to be consistent with a set $Q=\{(\sigma_j, Y_j)\}_j$ of sequence examples with positive instances if $\forall j: Y_j \subseteq [[P]]\sigma_j$. A sequence program P is said to be consistent with a set $Q=\{(\sigma_j, Y_j, Y'_j)\}_j$ of sequence examples with positive and negative instances if $\forall j: (Y_j \subseteq [[P]]\sigma_j \wedge Y'_j \cap [[P]]\sigma_j = \emptyset)$.

Next, the term "subsumption" as used herein is defined. Given a set $Q=\{(\sigma_j, Y_j)\}_j$ of sequence examples with positive instances, and two sequence programs $P_1$, $P_2$ that are consistent with Q, $P_1$ subsumes $P_2$ with respect to Q if $\forall j: [[P_1]]\sigma_j \subseteq [[P_2]]\sigma_j$.

As described herein, programs P returned by the sequence synthesis component 702 and the structure synthesis component 704 are consistent with the input set of examples. Moreover, if there exists some program that is consistent with the input set of examples, the sequence synthesis component 702 or the structure synthesis component 704 can produce such a program.

Exemplary instantiations of the general framework to three different data extraction domains, namely text files, webpages, and spreadsheets, are now provided for illustration purposes. For each domain, notation of a region and an underlying data extraction DSL are defined. In the exemplary DSLs provided below, core operators in a predefined library are in bold. Moreover, implementation of domain-specific learning methods are further described below. It is to be appreciated, however, that the following exemplary instantiations are provided for illustration purposes, and other instantiations of the general framework to differing data extraction domains are intended to fall within the scope of the hereto appended claims.

Exemplary Text Instantiation

In the text domain, a region can be represented as a pair of character positions in an input text file. The exemplary data extraction DSL for extracting data from text files is referred to herein as $\mathcal{L}_{text}$. The syntax of $\mathcal{L}_{text}$ is now provided.

```
Disjuctive Pos Pair Seq N₁ ::= Merge (SS₁, ... , SSₙ)
Pos Pair Region N₂ ::= Pair(Pos(R₀, p₁), Pos(R₀, p₂))
Pair Seq SS ::= LinesMap(λ x: Pair(Pos(x, p₁), Pos(x, p₂)),
LS)
    |StartSeqMap (λ x: Pair(x, Pos(R₀[x: ], p)), PS)
    |EndSeqMap (λ x: Pair(Pos(R₀[: x], p), x), PS)
Line Seq LS ::= FilterInt(init, iter, BLS)
Bool Line Seq BLS ::= FilterBool(b, split(R₀, '\n'))
Position Seq PS ::= LinesMap(λ x: Pos(x, p), LS)
    |Filterint(init, iter, PosSeq(R₀, rr))
Predicate b ::=λ x: True
    |λ x: {Starts, Ends}With(r, x)| λ x: Contains(r, k, x)
    |λ x: Pred{Starts, Ends}With(r, x)| λ x: PredContains(r, k, x)
    |λ x: Succ{Starts, Ends}With(r, x)| λ x: SuccContains(r, k, x)
Position Attribute p ::= AbsPos(k)|RegPos(rr, k)
Regex Pair rr ::= (r₁, r₂)     Regex r ::= T{0,3}
Token T ::= C + |DynamicToken
```

In $\mathcal{L}_{text}$, various Map operators can be named differently in order to associate different Decompose methods with them. The non-terminal $N_1$ is a merge operator over constituent sequence expressions SS. The non-terminal $N_2$ is defined as a pair operator over two position expressions.

The position expression Pos(x,p) evaluates to a position in string x that is determined by attribute p. The attribute p is either an absolute position k, or is the $k^{th}$ element of a position sequence identified by the regex pair rr, which includes two regexes $r_1$ and $r_2$. Selection order can be from left-to-right if k is positive, or right-to-left if k is negative. The position sequence identified by ($r_1$, $r_2$) in string x, also referred to as PosSeq(x, rr), is a set of positions k in x such that (a suffix of the substring on) the left side of k matches with $r_1$ and (a prefix of the substring on) the right side of k matches with $r_2$. A regex r is a concatenation of tokens (e.g., three or fewer). A token T can be a pre-defined character class such as alphabets, digits, colon character, etc. Moreover, context-sensitive tokens can be dynamically defined based on frequently occurring string literals in the neighborhood of examples highlighted by the user. For instance, in the text file 200 of FIG. 2, dynamically learned tokens can include the string "DLZ—Summary Report" (which can be useful for learning the outer structure boundary in the fifth color) and the string " "Sample ID:"" " (which can be useful to extract the sample ID in the sixth color).

As shown above, a first rule of SS can be a map operator referred to as LinesMap, which maps each line of a line sequence LS to a pair of positions within that line. The Decompose method for LinesMap can take as input a region R and a sequence of position pairs, and return the sequence of lines from R that includes the corresponding position pairs.

A second (third) rule of SS can pair each position x in a position sequence PS with a position that occurs somewhere on its right (left) side. The notation $R_0[x:]$ ($R_0[:x]$) denotes the suffix (prefix) of the text value represented by $R_0$ starting (ending) at position x. The Decompose method associated with StartSeqMap (EndSeqMap) can take as input a region R and a sequence of positions, and map each position k in the input sequence to the string [k:] (R[: k]).

The line sequence non-terminal LS can use a nested combination of FilterInt and FilterBool. A predicate b can be used in FilterBool. For example, StartsWith(r,x) can assert if line x starts with regex r, while Contains(r,k,x) can assert if line x contains k occurrences of regex r. Information from preceding and succeeding lines can also be used via Pred* and Succ* predicates. For example, PredStartsWith(r,x) can assert if the line preceding x in the input text file ends with regex r.

The position sequence non-terminal PS can include expressions that select a position within each line of a line sequence (using the LinesMap operator) or filter positions returned by the PosSeq operator (using the FilterInt operator).

Below is an exemplary program in $\mathcal{L}_{text}$ for extracting the regions highlighted in the fourth color in the text file 200 depicted in FIG. 2. As provided in this example, the regions in the fourth color can be extracted from the top-level region of the text file 200.

LinesMap(λ x: Pair(Pos(x, $p_1$), Pos(x, $p_2$)), LS), where
$p_1$ = AbsPos(0), $p_2$ = AbsPos(-1),
LS = FilterInt(0,1,
  FilterBool(λ x: EndsWith([Number, Quote], x), split($R_0$'\n')))

The FilterBool operator can take lines in the document and select the lines that end with a number and a quote. In the foregoing example, the FilterInt operator does not perform filtering (init=0,iter=1); instead, the FilterInt operator passes a result of FilterBool to LS. The map operator in LinesMap can return an input line (AbsPos(0) denotes the beginning of the line, while AbsPos(-1) denotes the end of the line). The LinesMap operator thus returns a sequence identical to LS, which is the sequence in the fourth color shown in FIG. 2.

Next, an exemplary program in $\mathcal{L}_{text}$ for extracting regions highlighted in the first color in the text file 200 shown in FIG. 2 is described. In this example, the regions in the first color can be extracted from the top-level region of the text file 200.

EndSeqMap(λ x: Pair(Pos($R_0$[: x], p), x), PS), where
  p = RegPos((|DynamicTok (, "")], ε), -1)
  PS = FilterInt(0,1, PosSeq($R_0$, ($r_1$, $r_2$)), and
  $r_1$ = [DynamicTok(, ""), Word],
  $r_2$ = [DynamicTok ("",), Number, Comma]

Prefixes (,"") and suffixes ("",) of given examples can be recognized as frequently occurring substrings, and accordingly, can be promoted to dynamic tokens. The PosSeq operator can return a sequence of end positions of the sequence highlighted in the first color in FIG. 2 (since each of these have an $r_1$ match on the left and an $r_2$ match on the right). Note that there are other positions that either have an $r_1$ match on the left (such as the position before the number in "Sample ID:,""5007-01"""), or have an $r_2$ match on the right (such as the position after the character L in " "ug/L"", 0.0009), but not both; hence, these positions are not selected by the PosSeq operator. Since FilterInt does not filter elements, PS is the same sequence returned by the regex pair. The map function in EndSeqMap takes each end position in PS and finds its corresponding start position specified by p, which is the first position from the right (k=-1) that matches the dynamic token (,"") on the left side. The result is the sequence highlighted in the first color as shown in FIG. 2.

Below is an exemplary extraction program in $\mathcal{L}_{text}$ if the field highlighted in the first color in FIG. 2 is wrapped within the structure highlighted in the fourth color.

Pair(Pos($R_0,p_1$),Pos($R_0,p_2$)), where $p_1$=⟨ [DynamicTok(,"")],ε,1⟨ ,$p_2$=⟩ ε,
  [DynamicTok("",)],1 ⟩

Since the field highlighted in the fourth color is the structure-ancestor of the field highlighted in the first color, a pair operator can be learned to extract a region in the first color within a region in the fourth color. The start position of this pair is the first position from the left (k=1) that matches (,"") on the left side ($r_1$), and the end position is the first position from the left that matches ("",) on the right side ($r_2$). This exemplary program (which exploits the separation determined by the program for the field in the fourth color) is simpler than the exemplary program described above where regions in the first color are extracted from the top-level region of the text file 200.

According to an example, the learning of Boolean expression b in the text domain can be performed by using brute-force search; however, the claimed subject matter is not so limited.

Exemplary Webpage Instantiation

In the webpage domain, a region can be either an HTML node or a pair of character positions within the text property of an HTML node. The exemplary data extraction DSL for extracting data from webpages is referred to herein as $\mathcal{L}_{web}$, and the syntax of $\mathcal{L}_{web}$ is set forth below.

```
Disjuctive Seq N₁ ::= Merge (NS₁, ... , NSₙ)
    |Merge(SS₁, ... , SSₙ)
Region N₂ ::= XPath|Pair(Pos (R₀, p₁), Pos(R₀, p₂))
Node Seq NS ::= XPaths
Pos Pair Seq SS ::=
    SeqPairMap (λ x: Pair(Pos(x. Val, p₁), Pos(x. Val, p₂)), ES)
    |StartSeqMap (λ x: Pair(x, Pos(R₀[x: ], p)), PS)
    |EndSeqMap (λ x: Pair(Pos(R₀[:x], p), x), PS)
Element Seq ES ::= FilterInt(init, iter, XPaths)
Position Seq PS ::= FilterInt(init, iter, PosSeq(R₀, rr))
```

As set forth above, XPath (XPaths) denote an expression (e.g., the expression can be in a query language for selecting nodes from an XML document) that returns a single HTML node (a sequence of HTML nodes) within the input HTML node. Position attribute p and regex pair rr are similar to those in the text instantiation DSL $\mathcal{L}_{text}$. The token set can additionally include dynamic tokens created for the various HTML tags identified in the input webpage.

The non-terminal $N_1$ can represent expressions that compute a sequence of HTML nodes or a sequence of position pairs within HTML nodes. The non-terminal $N_2$ can represent expressions that compute a HTML node or a position pair within a HTML node. For instance, HTML nodes in $\mathcal{L}_{web}$ can have a similar role as compared to lines in $\mathcal{L}_{text}$. Moreover, expressions in the query language for selecting nodes (e.g., XPath expressions) can be used to identify relevant HTML elements instead of using regular expressions to identify appropriate lines.

The non-terminal SS can represent expressions that generate a sequence of position pairs by mapping each HTML node in a sequence ES to position pairs (SeqPairMap operator) or by pairing up each position in a sequence PS of positions with another position computed relative to it (StartSeqMap and EndSeqMap operators).

Learn methods for XPath and XPaths from example HTML nodes can be defined. Further, a learn method can be implemented, where such learn method can generalize example nodes to path expressions by replacing inconsistent tags at any depth with "*" and incorporate common properties of example nodes. These properties can include the number of children, their types, the number of attributes and their types. The result can be a list of XPath expressions, ranging from specific to general.

Exemplary Spreadsheet Instantiation

In the spreadsheet domain, a region can be a rectangular region represented by a pair of cells or a single cell. The exemplary data extraction DSL for extracting data from spreadsheets is referred to herein as $\mathcal{L}_{sps}$. The syntax of $\mathcal{L}_{sps}$ is set forth below.

```
Disjuctive Cell Pair Seq N₁ ::= Merge (PS₁, ... , PSₙ)
    |Merge(CS₁, ... , CSₙ)
Cell Pair Region N₂ ::= Pair(Cell(R₀, c₁), Cell(R₀, c₂))
    |Cell(R₀, c)
Pair Seq PS ::= StartSeqMap (λ x: Pair(x, Cell(R₀[x: ], c)), CS)
    |EndSeqMap(λ x: Pair(Cell(R₀[: x], c), x), CS)
Cell Sequence CS ::= FilterInt(init, iter, CE)
    |CellRowMap (λ x: Cell(x, c), RS)
Row Sequence RS ::= FilterInt(init, iter, RE)
Cell Attribute c := AbsCell(k)|RegCell(cb, k)
Cell Split Seq CE ::= FilterBool(cb, splitcells(R₀))
Row Split Seq RE ::= FilterBool(rb, splitrow(R₀))
Cell Boolean cb ::=λ x: True| λ x: Surround(T{9}, x)
Row Boolean rb ::=λ x: True| λ x: Sequence(T+, x)
```

As set forth above, the non-terminal $N_1$ can represent expressions that extract a sequence of cell pairs or a sequence of cells from a given rectangular region in a spreadsheet. The non-terminal $N_2$ can represent expressions that extract a cell pair or a single cell from a given rectangular region in a spreadsheet.

The notion of a row in $\mathcal{L}_{sps}$ can be similar to that of a line in $\mathcal{L}_{text}$ and an HTML node in $\mathcal{L}_{web}$. Just as the Boolean expression in $\mathcal{L}_{text}$ can enable filtering lines by matching their content against regular expressions, the row Boolean expression rb in $\mathcal{L}_{sp}$, can select spreadsheet rows by matching contents of consecutive cells inside a row against some token sequence. In addition, the cell Boolean expression cb can select cells by matching contents of the cell and its 8 neighboring cells against some 9 tokens.

The functions splitcells and splitrows can split a spreadsheet region into a sequence of cells (obtained by scanning the region from top to down and left to right) and into a sequence of rows respectively, on which cell and row Boolean expressions can be applied.

The learning of Boolean expression cb and rb can be performed using brute-force search. Learn methods for domain-specific top-level non-terminals c, cb and rb can be defined. To learn c, brute-force search to find matching cell expressions cb can be performed. Moreover, learning the row expression rb can be similar.

Figure 8:
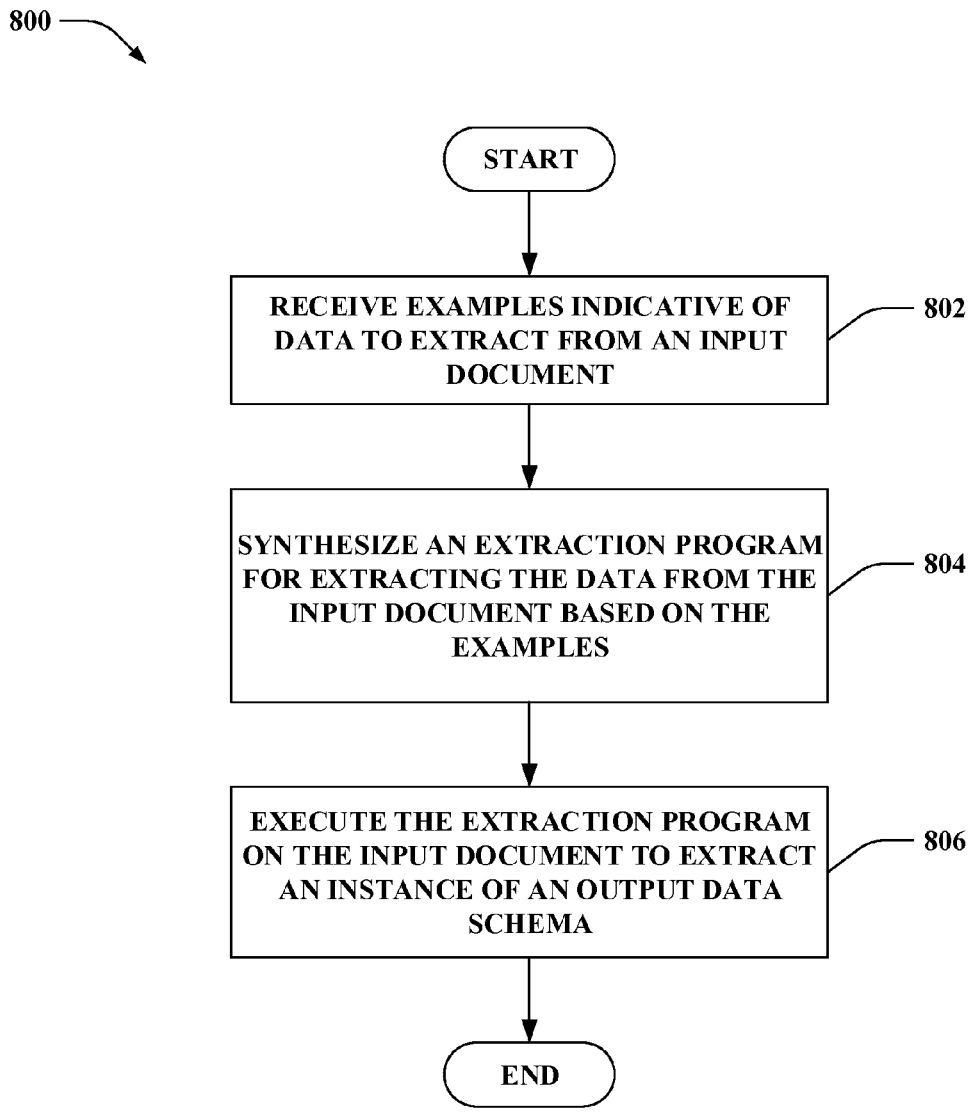
FIG. 8 is a flow diagram that illustrates an exemplary methodology of controlling programming for extracting data from an input document.
Figure 9:
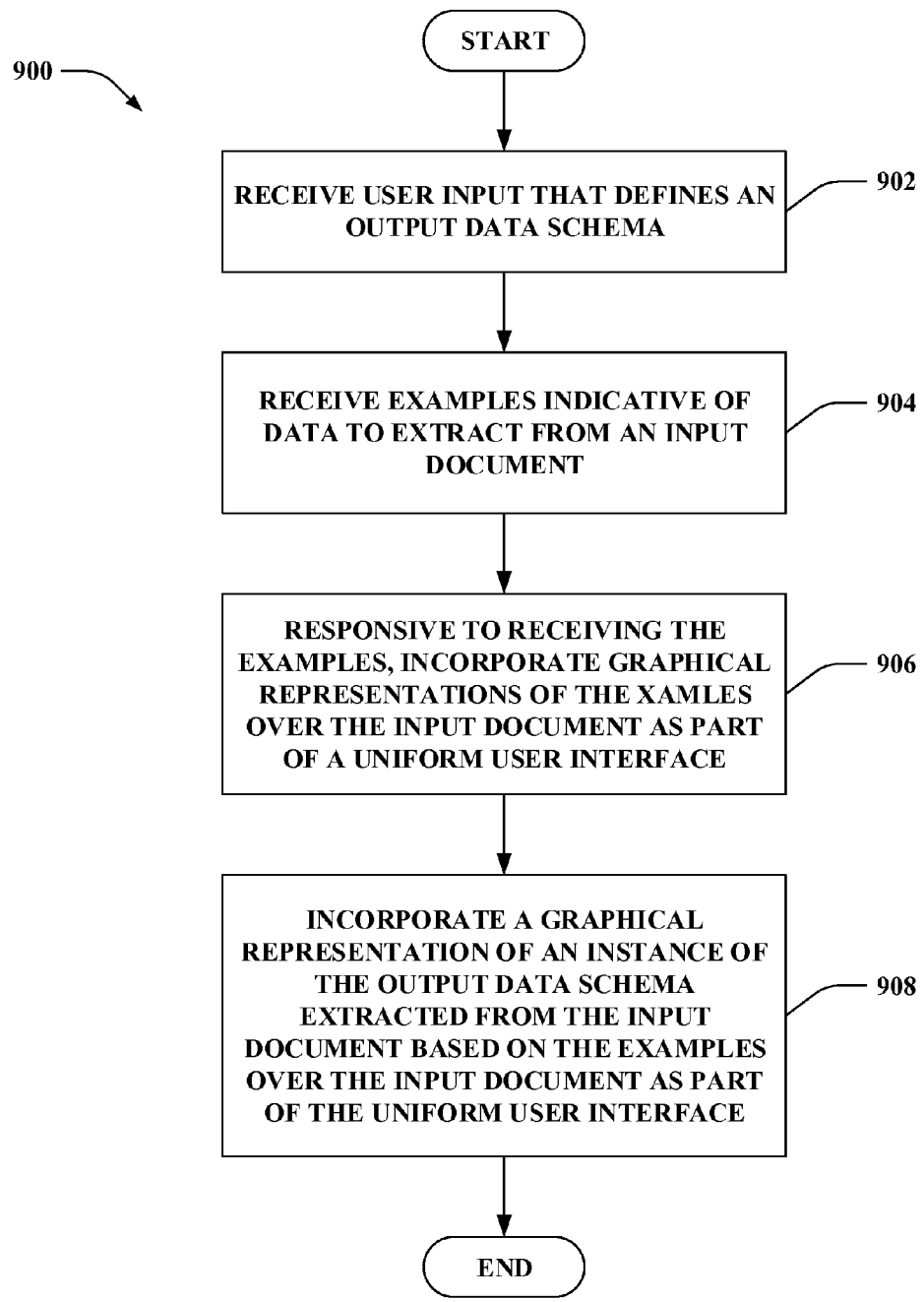
FIG. 9 is a flow diagram that illustrates an exemplary methodology of controlling interactions for data extraction programming.

FIGS. 8-9 illustrate exemplary methodologies relating to controlling programming for data extraction based on examples. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 8 illustrates a methodology 800 of controlling programming for extracting data from an input document. At 802, examples indicative of the data to extract from the input document can be received. The examples can include highlighted regions on the input document. Moreover, the input document is a semi-structured document. At 804, an extraction program for extracting data from the input document can be synthesized based on the examples. The extraction program can be synthesized in a DSL for a type of the input document. At 806, the extraction program can be executed on the input document to extract an instance of an output data schema. The output data schema, for example, can be defined based on a received user input.

Now turning to FIG. 9, illustrated is a methodology 900 of controlling interactions for data extraction programming. At 902, user input that defines an output data schema can be received. The output data schema can include a hierarchical combination of structure and sequence constructs. At 904, examples indicative of data to extract from an input document can be received. The examples can include at least one example of each of the constructs of the output data schema. At 906, responsive to receiving the examples, graphical representations of the examples can be incorporated over the input document as part of a uniform user interface. At 908, a graphical representation of an instance of the output data schema extracted from the input document based on the examples can be incorporated over the input document as part of the uniform user interface.

Figure 10:
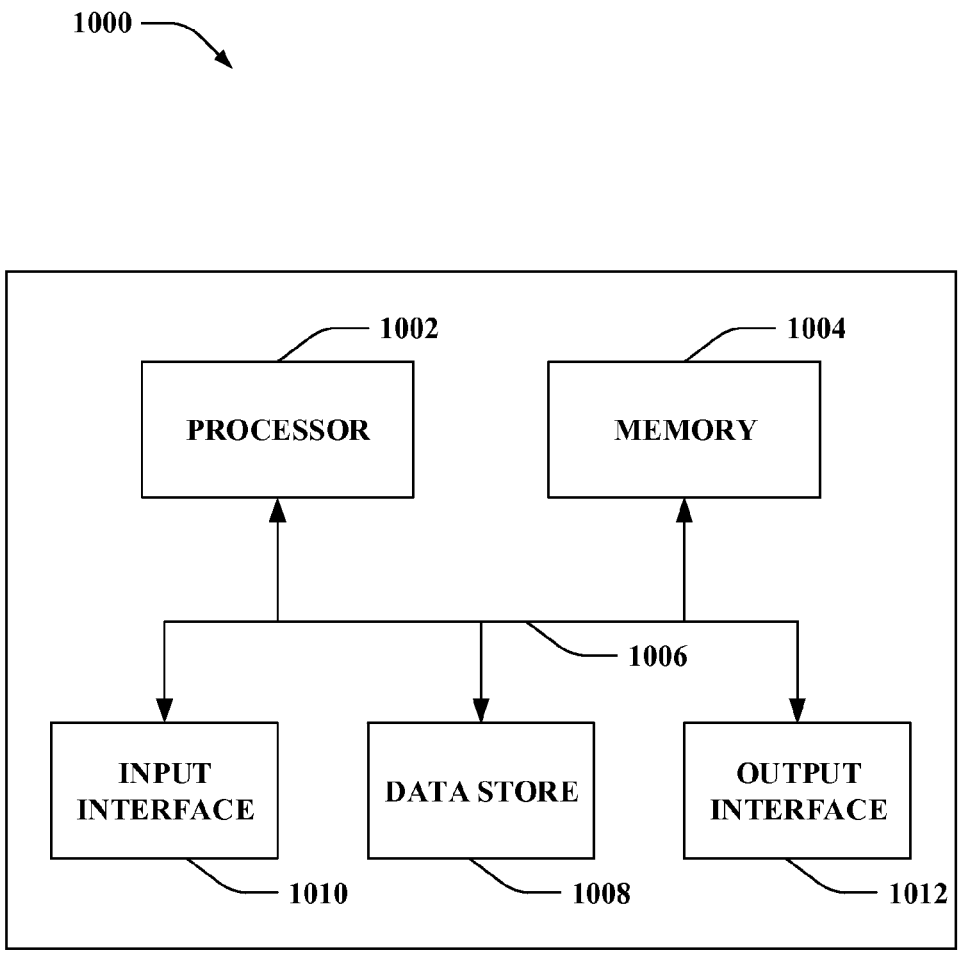
FIG. 10 illustrates an exemplary computing device.

Referring now to FIG. 10, a high-level illustration of an exemplary computing device 1000 that can be used in accordance with the systems and methodologies disclosed herein is illustrated. For instance, the computing device 1000 may be or include the computing system 100 of FIG. 1. Additionally or alternatively, the computing system 100 of FIG. 1 can be or include the computing device 1000. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store input documents, extraction programs, and so forth.

The computing device 1000 additionally includes a data store 1008 that is accessible by the processor 1002 by way of the system bus 1006. The data store 1008 may include executable instructions, input documents, extraction programs, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Figure 11:
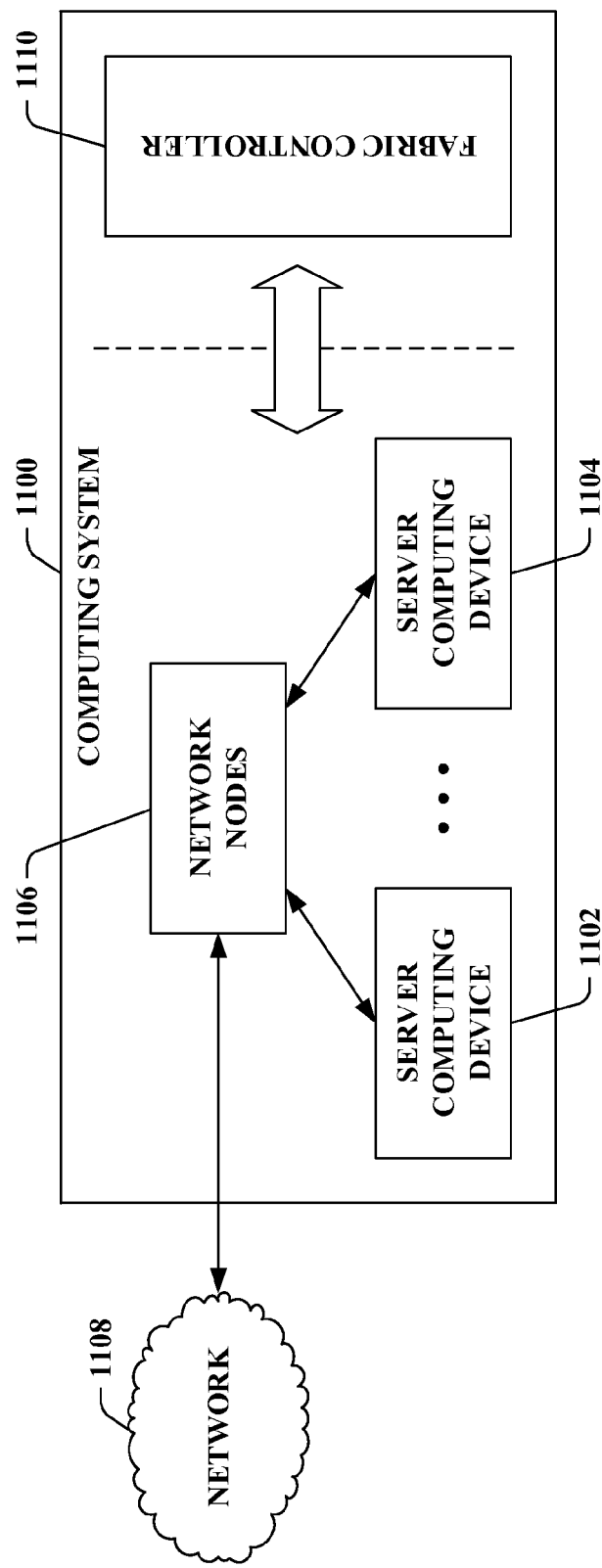
FIG. 11 illustrates an exemplary computing system.

Turning to FIG. 11, a high-level illustration of an exemplary computing system 1100 that can be used in accordance with the systems and methodologies disclosed herein is illustrated. For instance, the computing system 1100 can be or include the computing system 100. Additionally or alternatively, the computing system 100 can be or include the computing system 1100.

The computing system 1100 includes a plurality of server computing devices, namely, a server computing device 1102, . . . , and a server computing device 1104 (collectively referred to as server computing devices 1102-1104). The server computing device 1102 includes at least one processor and a memory; the at least one processor executes instructions that are stored in the memory. The instructions may be, for instance, instructions for implementing functionality described as being carried out by one or more components discussed above or instructions for implementing one or more of the methods described above. Similar to the server computing device 1102, at least a subset of the server computing devices 1102-1104 other than the server computing device 1102 each respectively include at least one processor and a memory. Moreover, at least a subset of the server computing devices 1102-1104 include respective data stores.

Processor(s) of one or more of the server computing devices 1102-1104 can be or include the processor 104. Further, a memory (or memories) of one or more of the server computing devices 1102-1104 can be or include the memory 106.

The computing system 1100 further includes various network nodes 1106 that transport data between the server computing devices 1102-1104. Moreover, the network nodes 1102 transport data from the server computing devices 1102-1104 to external nodes (e.g., external to the computing system 1100) by way of a network 1108. The network nodes 1102 also transport data to the server computing devices 1102-1104 from the external nodes by way of the network 1108. The network 1108, for example, can be the Internet, a cellular network, or the like. The network nodes 1106 include switches, routers, load balancers, and so forth.

A fabric controller 1110 of the computing system 1100 manages hardware resources of the server computing devices 1102-1104 (e.g., processors, memories, data stores, etc. of the server computing devices 1102-1104). The fabric controller 1110 further manages the network nodes 1106. Moreover, the fabric controller 1110 manages creation, provisioning, de-provisioning, and supervising of virtual machines instantiated upon the server computing devices 1102-1104.

Various examples are now set forth.

Example 1

A computing system, comprising: at least one processor; and memory comprising a data extraction system, the data extraction system being executable by the at least one processor, the data extraction system comprising: an interaction component configured to receive examples indicative of data to extract from an input document, the examples comprise highlighted regions on the input document, the input document being a semi-structured document; a synthesis component configured to synthesize an extraction program for extracting the data from the input document based on the examples, the extraction program synthesized in a domain-specific language (DSL) for a type of the input document; and an interpretation component configured to execute the extraction program on the input document to extract an instance of an output data schema.

Example 2

The computing system according to Example 1, the interaction component further configured to receive user input that defines the output data schema, wherein the output data schema comprises a hierarchical combination of structure and sequence constructs.

Example 3

The computing system according to any of Examples 1-2, the input document being one of a text file, a log file, a word processor document, a semi-structured spreadsheet, a webpage, or a fixed-layout document.

Example 4

The computing system according to any of Examples 1-2, the input document being an image file, wherein optical character recognition is executed on the image file prior to extracting the data from the input document.

Example 5

The computing system according to any of Examples 1-4, the interaction component further configured to: responsive to receipt of the examples, incorporate the highlighted regions specified by the examples over the input document as part of a uniform user interface; and responsive to execution of the extraction program on the input document, incorporate highlighting indicative of the instance of the output data schema over the input document as part of the uniform user interface.

Example 6

The computing system according to any of Examples 1-5, wherein: the interaction component further configured to receive one or more refining examples subsequent to execution of the extraction program on the input document, the one or more refining examples comprising at least one of an additional highlighted region on the input document or a negative example of a region on the input document not to be highlighted; the synthesis component further configured to synthesize an updated extraction program for extracting the data from the input document based on the examples and the one or more refining examples; and the interpretation component further configured to execute the updated extraction program on the input document to extract an updated instance of the output data schema.

Example 7

The computing system according to any of Examples 1-6, the interpretation component further configured to execute the extraction program on a differing input document to extract a differing instance of the output data schema.

Example 8

The computing system according to any of Examples 1-7, the interaction component further configured to output the instance of the output data schema as at least one of a table or an XML file.

Example 9

The computing system according to any of Examples 1-8, wherein the DSL for the type of the input document is constructed from a predefined library of core operators, and at least one differing DSL for a differing input document type is constructed from the predefined library of the core operators.

Example 10

The computing system according to any of Examples 1-9, the synthesis component further configured to: synthesize potential extraction programs that are consistent with the examples, the potential extraction programs comprise the extraction program; rank the potential extraction programs; and select the extraction program based on rankings of the potential extraction programs.

Example 11

A computing system, comprising: at least one processor; and memory comprising a data extraction system, the data extraction system being executable by the at least one processor, the data extraction system comprising: a synthesis component configured to: execute inductive synthesis algorithms for core operators in a predefined library; and synthesize an extraction program for extracting data from an input document by executing the inductive synthesis algorithms, the extraction program being synthesized in a domain specific language (DSL) for an input document type of the input document, the DSL being constructed from the predefined library of the core operators.

Example 12

The computing system according to Example 11, the synthesis component further configured to synthesize a differing extraction program for extracting data from a differing input document by executing the inductive synthesis algorithms, the differing extraction program being synthesized in a differing DSL for a differing input document type of the differing input document, the differing DSL being constructed from the predefined library of the core operators.

Example 13

The computing system according to any of Examples 11-12, the predefined library of the core operators comprises a decomposable map operator, a filter operator, a merge operator, and a pair operator.

Example 14

The computing system according to Example 13, the synthesis component further comprising: a map learning component configured to yield an inductive synthesis algorithm for the decomposable map operator; a merge learning component configured to yield an inductive synthesis algorithm for the merge operator; a filter learning component configured to yield an inductive synthesis algorithm for the filter operator; and a pair learning component configured to yield an inductive synthesis algorithm for the pair operator.

Example 15

The computing system according to any of Examples 11-14, the data extraction system further comprising: an interaction component configured to receive examples indicative of the data to extract from the input document, the examples comprise highlighted regions on the input document; and an interpretation component configured to execute the extraction program on the input document to extract an instance of an output data schema.

Example 16

A method of controlling interactions for data extraction programming, comprising: receiving user input that defines an output data schema, the output data schema comprises a hierarchical combination of structure and sequence constructs; receiving examples indicative of data to extract from an input document, the examples comprise at least one example for each of the constructs of the output data schema; responsive to receiving the examples, incorporating graphical representations of the examples over the input document as part of a uniform user interface; and incorporating a graphical representation of an instance of the output data schema extracted from the input document based on the examples, the graphical representation of the instance of the output data schema being incorporated over the input document as part of the uniform user interface.

Example 17

The method according to Example 16, further comprising: receiving at least two positive examples of a sequence construct in the output data schema.

Example 18

The method according to any of Examples 16-17, wherein the examples are received in a user-selected iteration order over fields of the output data schema.

Example 19

The method according to any of Examples 16-18, wherein a graphical representation of an example comprises a highlighted region over a portion of the input document.

Example 20

The method according to any of Examples 16-19, further comprising: subsequent to incorporating the graphical representation of the instance of the output data schema over the input document as part of the uniform user interface: receiving a refining example; responsive to receiving the refining example, incorporating a graphical representation of the refining example over the input document as part of a uniform user interface; and incorporating a graphical representation of an updated instance of the output data schema extracted from the input document based on the examples and the refining example, the graphical representation of the updated instance of the output data schema being incorporated over the input document as part of the uniform user interface.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system, comprising:
   at least one processor; and
   memory that comprises computer-executable instructions that, when executed by the at least one processor, cause the at least one processor to perform acts including:
   receiving examples of data to extract from an input document, the examples comprise portions of the input document within highlighted regions on the input document, the input document being a semi-structured document;

synthesizing an extraction program for extracting the data from the input document based on the examples, the extraction program synthesized in a domain-specific language (DSL) for a type of the input document, the extraction program synthesized by utilizing inductive synthesis algorithms usable across different DSLs; and executing the extraction program on the input document to extract an instance of an output data schema.

2. The computing system of claim 1, the memory further comprising computer-executable instructions that, when executed by the at least one processor, cause the at least one processor to perform acts including:

receiving user input that defines the output data schema, wherein the output data schema comprises a hierarchical combination of structure and sequence constructs.

3. The computing system of claim 1, the input document being one of a text file, a log file, a word processor document, a semi-structured spreadsheet, a webpage, or a fixed-layout document.

4. The computing system of claim 1, the input document being an image file, wherein optical character recognition is executed on the image file prior to extracting the data from the input document.

5. The computing system of claim 1, the memory further comprising computer-executable instructions that, when executed by the at least one processor, cause the at least one processor to perform acts including:

responsive to receipt of the examples, incorporating the highlighted regions specified by the examples over the input document as part of a uniform user interface, the uniform user interface being for a plurality of different input document types; and responsive to execution of the extraction program on the input document, incorporating highlighting indicative of the instance of the output data schema over the input document as part of the uniform user interface.

6. The computing system of claim 1, the memory further comprising computer-executable instructions that, when executed by the at least one processor, cause the at least one processor to perform acts including:

receiving one or more refining examples subsequent to execution of the extraction program on the input document, the one or more refining examples comprising at least one of an additional portion of the input document within an additional highlighted region on the input document or a negative example of a portion of the input document within a region on the input document not to be highlighted;

synthesizing an updated extraction program for extracting the data from the input document based on the examples and the one or more refining examples; and executing the updated extraction program on the input document to extract an updated instance of the output data schema.

7. The computing system of claim 1, the memory further comprising computer-executable instructions that, when executed by the at least one processor, cause the at least one processor to perform acts including:

executing the extraction program on a differing input document to extract a differing instance of the output data schema.

8. The computing system of claim 1, the memory further comprising computer-executable instructions that, when executed by the at east one processor, cause the at least one processor to perform acts including:

outputting the instance of the output data schema as at least one of a table or an XML file.

9. The computing system of claim 1, wherein the DSL for the type of the input document is constructed from a predefined library of core operators, and at least one differing DSL for a differing input document type is constructed from the predefined library of the core operators.

10. The computing system of claim 1, the memory further comprising computer-executable instructions that, when executed by the at least one processor, cause the at least one processor to perform acts including:

synthesizing potential extraction programs that are consistent with the examples, the potential extraction programs comprise the extraction program;

ranking the potential extraction programs; and selecting the extraction program based on rankings of the potential extraction programs.

11. A computing system, comprising:

at least one processor; and memory that comprises computer-executable instructions that, when executed by the at least one processor, cause the at least one processor to perform acts including:

executing inductive synthesis algorithms for core operators in a predefined library; and synthesizing an extraction program for extracting data from an input document by executing the inductive synthesis algorithms, the extraction program being synthesized in a domain specific language (DSL) for an input document type of the input document, the DSL being constructed from the predefined library of the core operators.

12. The computing system of claim 11, the memory further comprising computer-executable instructions that, when executed by the at least one processor, cause the at least one processor to perform acts including:

synthesizing a differing extraction program for extracting data from a differing input document by executing the inductive synthesis algorithms, the differing extraction program being synthesized in a differing DSL for a differing input document type of the differing input document, the differing DSL being constructed from the predefined library of the core operators.

13. The computing system of claim 11, the predefined library of the core operators comprises a decomposable map operator, a filter operator, a merge operator, and a pair operator.

14. The computing system of claim 13, wherein the inductive synthesis algorithms for the core operators comprise:

an inductive synthesis algorithm for the decomposable map operator;

an inductive synthesis algorithm for the merge operator;

an inductive synthesis algorithm for the filter operator; and an inductive synthesis algorithm for the pair operator.

15. The computing system of claim 11, the memory further comprising computer-executable instructions that, when executed by the at least one processor, cause the at least one processor to perform acts including:

receiving examples of the data to extract from the input document, the examples comprise portions of the input document within highlighted regions on the input document; and executing the extraction program on the input document to extract an instance of an output data schema.

16. A method of controlling interactions for data extraction programming, comprising:
  receiving user input that defines an output data schema, the output data schema comprises a hierarchical combination of structure and sequence constructs;
  receiving examples of data to extract from an input document, the examples comprise at least one example for each of the constructs of the output data schema;
  responsive to receiving the examples, causing at least one processor to incorporate graphical representations of the examples over the input document as part of a uniform user interface, the uniform user interface being for a plurality of different input document types; and
  causing the at least one processor to incorporate a graphical representation of an instance of the output data schema extracted from the input document based on the examples, the graphical representation of the instance of the output data schema being incorporated over the input document as part of the uniform user interface.

17. The method of claim 16, further comprising:
  receiving at least two positive examples of a sequence construct in the output data schema.

18. The method of claim 16, wherein the examples are received in a user-selected iteration order over fields of the output data schema.

19. The method of claim 16, wherein a graphical representation of an example comprises a highlighted region over a portion of the input document.

20. The method of claim 16, further comprising:
  subsequent to incorporating the graphical representation of the instance of the output data schema over the input document as part of the uniform user interface:
    receiving a refining example;
    responsive to receiving the refining example, incorporating a graphical representation of the refining example over the input document as part of a uniform user interface; and
  incorporating a graphical representation of an updated instance of the output data schema extracted from the input document based on the examples and the refining example, the graphical representation of the updated instance of the output data schema being incorporated over the input document as part of the uniform user interface.

* * * * *